(12) United States Patent
Takahashi

(10) Patent No.: US 7,453,598 B2
(45) Date of Patent: Nov. 18, 2008

(54) IMAGE PROCESSING METHOD AND APPARATUS, AND COLOR CONVERSION TABLE GENERATION METHOD AND APPARATUS

(75) Inventor: Kenji Takahashi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 1155 days.

(21) Appl. No.: 10/637,881

(22) Filed: Aug. 8, 2003

(65) Prior Publication Data

US 2004/0036898 A1 Feb. 26, 2004

(30) Foreign Application Priority Data

| | | |
|---|---|---|
| Aug. 8, 2002 | (JP) | 2002-231441 |
| Aug. 9, 2002 | (JP) | 2002-233846 |
| Jul. 28, 2003 | (JP) | 2003-202591 |

(51) Int. Cl.
*H04N 1/50* (2006.01)
*H04N 1/58* (2006.01)
*H04N 1/60* (2006.01)
*G06K 9/00* (2006.01)

(52) U.S. Cl. .................. 358/1.9; 358/504; 358/523; 358/532; 358/3.27; 382/162; 382/167

(58) Field of Classification Search .............. 358/1.9, 358/531, 504, 523, 532, 3.27; 345/698, 604, 345/629, 1.1, 1.2, 204, 4, 624, 626; 382/251, 382/162, 167

See application file for complete search history.

(56) References Cited

U.S. PATENT DOCUMENTS

| | | | | |
|---|---|---|---|---|
| 4,893,181 A | * | 1/1990 | Yeomans | 358/531 |
| 5,065,149 A | * | 11/1991 | Marsh et al. | 345/698 |
| 5,202,935 A | | 4/1993 | Kanamori et al. | |
| 5,271,096 A | * | 12/1993 | Cook | 345/604 |

(Continued)

FOREIGN PATENT DOCUMENTS

CN 1168597 A 10/1998

(Continued)

OTHER PUBLICATIONS

English Abstract of JP 10-276443 (corresponding to CN1168597A).

(Continued)

*Primary Examiner*—Edward L. Coles
*Assistant Examiner*—Charlotte M Baker
(74) *Attorney, Agent, or Firm*—Morgan & Finnegan, L.L.P.

(57) ABSTRACT

Arbitrary source image data, and destination image data obtained by retouching the source image data are recorded. When the user sets, using an image sensing mode setting unit, an image sensing mode, image reproduction parameters of which are to be changed, and instructs to execute a parameter change process, a parameter determination unit changes the image reproduction parameters using the source and destination image data. The parameter determination unit generates a color conversion list by comparing the two image data, and changes the image reproduction parameters in the image sensing mode set by the image sensing mode setting unit using the color conversion list. In this way, an image can be reproduced using the image reproduction parameters that reflect the contents retouched by the user, and color setups of user's preference can be given to an image to be reproduced.

43 Claims, 26 Drawing Sheets

U.S. PATENT DOCUMENTS

| | | | |
|---|---|---|---|
| 5,335,097 A | 8/1994 | Murakami | |
| 6,137,903 A | 10/2000 | Dichter | |
| 6,661,425 B1 * | 12/2003 | Hiroaki | 345/629 |
| 2002/0135687 A1 | 9/2002 | Nakajima et al. | |
| 2002/0135688 A1 * | 9/2002 | Niikawa | 348/251 |

FOREIGN PATENT DOCUMENTS

| | | |
|---|---|---|
| EP | 0 566 914 A1 | 10/1993 |
| EP | 0 709 806 A2 | 5/1996 |
| EP | 1 139 656 A1 | 10/2001 |
| JP | 01061172 A | 3/1989 |
| JP | A6-169394 | 6/1994 |
| JP | 08191400 A | 7/1996 |
| JP | 10-112869 A | 4/1998 |
| JP | 11-187351 | 7/1999 |
| JP | 2001-251640 A | 9/2001 |
| JP | 2001-2516450 A | 9/2001 |
| JP | 2002314803 | 10/2002 |

OTHER PUBLICATIONS

Chinese Office Action (Oct. 14, 2005).
Japanese Office Action (Dec. 2, 2005).
European Search Report (Jan. 24, 2006).
Japanese Office Action dated May 8, 2006 for corresponding Japanese Appln. No. 2002-233846.
Japanese Office Action dated Jul. 24, 2006 (from JP 2003-202591).
Kunihiko Sugiyama et al., Adobe Official Guide Book 2, Adobe Photoshop 5.0, Adobe Systems Co., Ltd., Dec. 15, 1998, pp. 84-86.

* cited by examiner

| R | R | R | R | R | R |
|---|---|---|---|---|---|
| R | R | R | R | R | R |
| R | R | R | R | R | R |
| R | R | R | R | R | R |
| R | R | R | R | R | R |
| R | R | R | R | R | R |

| G1 | G1 | G1 | G1 | G1 | G1 |
|---|---|---|---|---|---|
| G1 | G1 | G1 | G1 | G1 | G1 |
| G1 | G1 | G1 | G1 | G1 | G1 |
| G1 | G1 | G1 | G1 | G1 | G1 |
| G1 | G1 | G1 | G1 | G1 | G1 |
| G1 | G1 | G1 | G1 | G1 | G1 |

| G2 | G2 | G2 | G2 | G2 | G2 |
|---|---|---|---|---|---|
| G2 | G2 | G2 | G2 | G2 | G2 |
| G2 | G2 | G2 | G2 | G2 | G2 |
| G2 | G2 | G2 | G2 | G2 | G2 |
| G2 | G2 | G2 | G2 | G2 | G2 |
| G2 | G2 | G2 | G2 | G2 | G2 |

| B | B | B | B | B | B |
|---|---|---|---|---|---|
| B | B | B | B | B | B |
| B | B | B | B | B | B |
| B | B | B | B | B | B |
| B | B | B | B | B | B |
| B | B | B | B | B | B |

| Src | | Dst |
|---|---|---|
| (Rsn, Gsn, Bsn) | → | (Rdn, Gdn, Bdn) |
| (0, 0, 0) | → | (0, 0, 0) |
| (32, 0, 0) | → | (32, 0, 0) |
| (64, 0, 0) | → | (64, 0, 0) |

.
.

(128, 192, 224) → (128, 180, 226)

.

(160, 192, 224) → (160, 185, 224)

.

(160, 224, 255) → (160, 212, 255)

.
.

(224, 255, 255) → (224, 255, 255)

.

(255, 255, 255) → (255, 255, 255)

F I G. 11
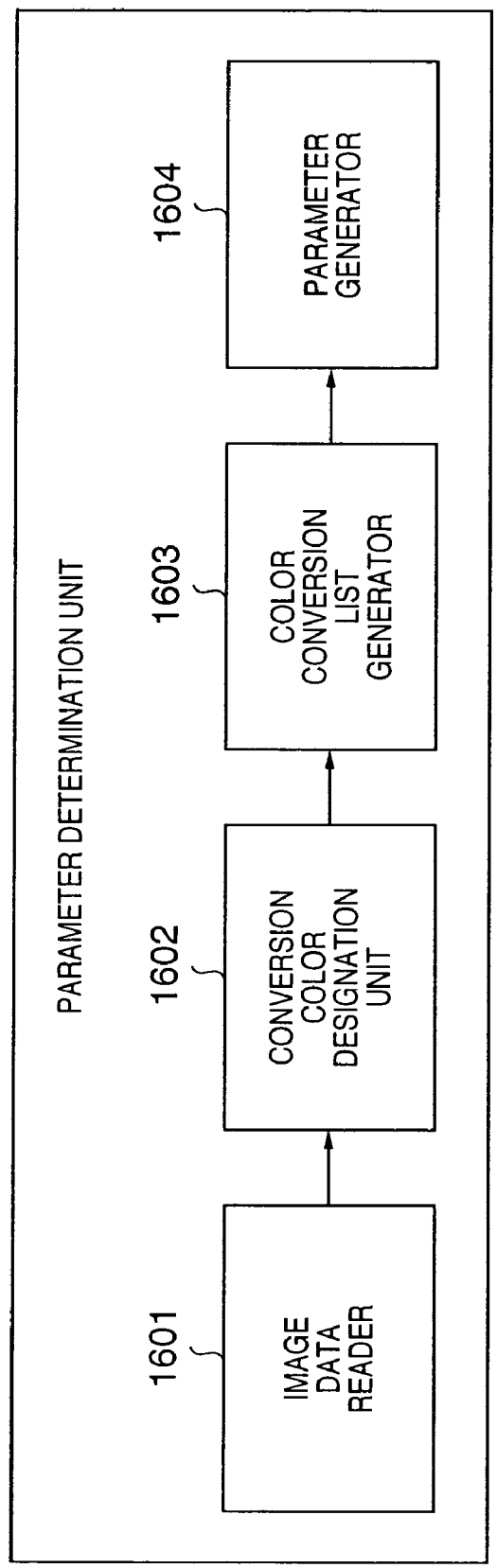

FIG. 12

| Src | Dst |
|---|---|
| (Rs, Gs, Bs) → | (Rd, Gd, Bd) |
| (128, 192, 224) → | (128, 180, 226) |
| (30, 0, 0) → | (32, 5, 0) |
| (62, 0, 0) → | (64, 0, 0) |

| CUSTOM MODE | LIST OF REGISTERED COLOR CONVERSION LISTS | |
|---|---|---|
| No. | COLOR CONVERSION LIST NAME | DATE OF CREATION |
| 1. | COLOR CONVERSION LIST 1 | 2003/05/05 |
| 2. | COLOR CONVERSION LIST 2 | 2003/06/28 |
| 3. | COLOR CONVERSION LIST 3 | 2003/07/11 |
| 4. | COLOR CONVERSION LIST 4 | 2003/07/07 |

IMAGE PROCESSING METHOD AND APPARATUS, AND COLOR CONVERSION TABLE GENERATION METHOD AND APPARATUS

FIELD OF THE INVENTION

The present invention relates to an image processing apparatus and method, a color conversion table generation apparatus and method, an image sensing apparatus, a computer program, and a computer readable recording medium and, more particularly, to a technique suitably used to execute a color conversion process for image data obtained by sensing an object image.

BACKGROUND OF THE INVENTION

Some conventional image sensing apparatuses can internally change color conversion parameters (hue levels, saturation levels, gamma tables, contrast levels, and the like) to obtain an image of user's preference. In general, in such image sensing apparatus, the user can select a desired one of a plurality of parameter sets prepared in advance by a manufacturer, and a color conversion process is executed using the selected parameter set to obtain an image of user's preference (see Japanese Patent Laid-Open No. 11-187351).

However, in such conventional image sensing apparatus, upon setting the color conversion parameters, the user must actually change color conversion parameters to sense a similar scene, and must confirm if an image of his or her preference is obtained. That is, the setups of the color conversion parameters force such trial-and-error sequences, resulting in very complicated operations.

Such change process of the color conversion parameters in the conventional image sensing apparatus suffers the following problems: the degree of freedom in change is small, and the need for changing only a specific color (e.g., a color of sky) cannot be met since such change influences all colors to be reproduced. For this reason, a setup that the user wants cannot always be attained, and it becomes difficult to obtain an image of user's preference.

As a method of performing color conversion to change the color of an image captured using a digital camera or scanner to a preferred color appearance, a method of generating a color conversion table (lookup table) and performing color conversion using that table has been proposed. For example, a color expressed on a three-dimensional (3D) color space such as an RGB color space or the like can undergo color conversion by preparing a 3D lookup table. Color conversion using such lookup table allows to freely design color conversion parameters, e.g., to convert only a local color on the color space.

However, a local color can be changed, but then the continuity of table data may be lost when parameters which change a color extremely are set. For example, when certain data in a lookup table is set to change an input color extremely, surrounding input colors change largely. For this reason, the output colors become unnatural.

Under such circumstances of the prior arts, an image processing technique that allows to easily obtain an image of user's preference is demanded.

For example, it is demanded to automatically set color conversion parameters on the basis of images before and after an edit process by retouching or the like, and to easily realize color conversion of user's preference.

Also, it is demanded to automatically set color conversion parameters from a pair of colors designated by the user, and to easily realize color conversion of user's preference.

Furthermore, a technique that can change only a desired color and colors close to that color is demanded.

Moreover, it is demanded to prevent discontinuity of colors in a reproduced image in a color conversion technique using a color conversion table.

SUMMARY OF THE INVENTION

According to one aspect of the present invention, there is provided an image processing apparatus comprising: acquisition device which acquires at least one color signal value pair indicating color signal values from an image; determination device which determines an image processing parameter on the basis of the acquired color signal value pair; registration device which registers the image processing parameter determined by the determination device; and conversion device which converts color signal values of an input image on the basis of the image processing parameter determined by the determination device, and outputs a converted image as an output image.

Furthermore according to another aspect of the present invention, there is provided an image processing method comprising: acquiring at least one color signal value pair indicating color signal values from an image; determining an image processing parameter on the basis of the acquired color signal value pair; registering the image processing parameter determined in the determination step; and converting color signal values of an input image on the basis of the image processing parameter determined in the determination step, and outputting a converted image as an output image.

Furthermore according to another aspect of the present invention, there is provided an apparatus for generating a color conversion table, comprising: storage device which stores first and second images, pixel values of which are expressed on an N-dimensional color space; generation device which generates an N-dimensional color conversion table on the basis of differences between pixel values of corresponding pixels in the first and second images; and adjustment device which adjusts generation of table values of the color conversion table by the generation device so that a change amount of a pixel value defined by the color conversion table generated by the generation device does not exceed a predetermined value.

Furthermore according to another aspect of the present invention, there is provided a method for generating a color conversion table, comprising: generating an N-dimensional color conversion table on the basis of differences between pixel values of corresponding pixels in first and second images, pixel values of which are expressed on an N-dimensional color space; and adjusting generation of table values of the color conversion table in the generating step so that a change amount of a pixel value defined by the color conversion table generated in the generation step does not exceed a predetermined value.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 shows a concept of a CCD digital signal after an interpolation process according to the first embodiment;

FIG. 7A shows a color conversion list according to the first embodiment;

FIG. 11 is a block diagram for explaining the process of a parameter determination unit according to the third embodiment;

FIG. 12 shows an example of a designated conversion color list according to the third embodiment;

FIG. 24 shows a display example of a list table of image reproduction parameters or color conversion lists, which are generated and registered according to the first to third embodiments.

DETAILED DESCRIPTION OF THE PREFERRED EMBODIMENTS

Preferred embodiments of the present invention will now be described in detail in accordance with the accompanying drawings.

First Embodiment

Figure 1:
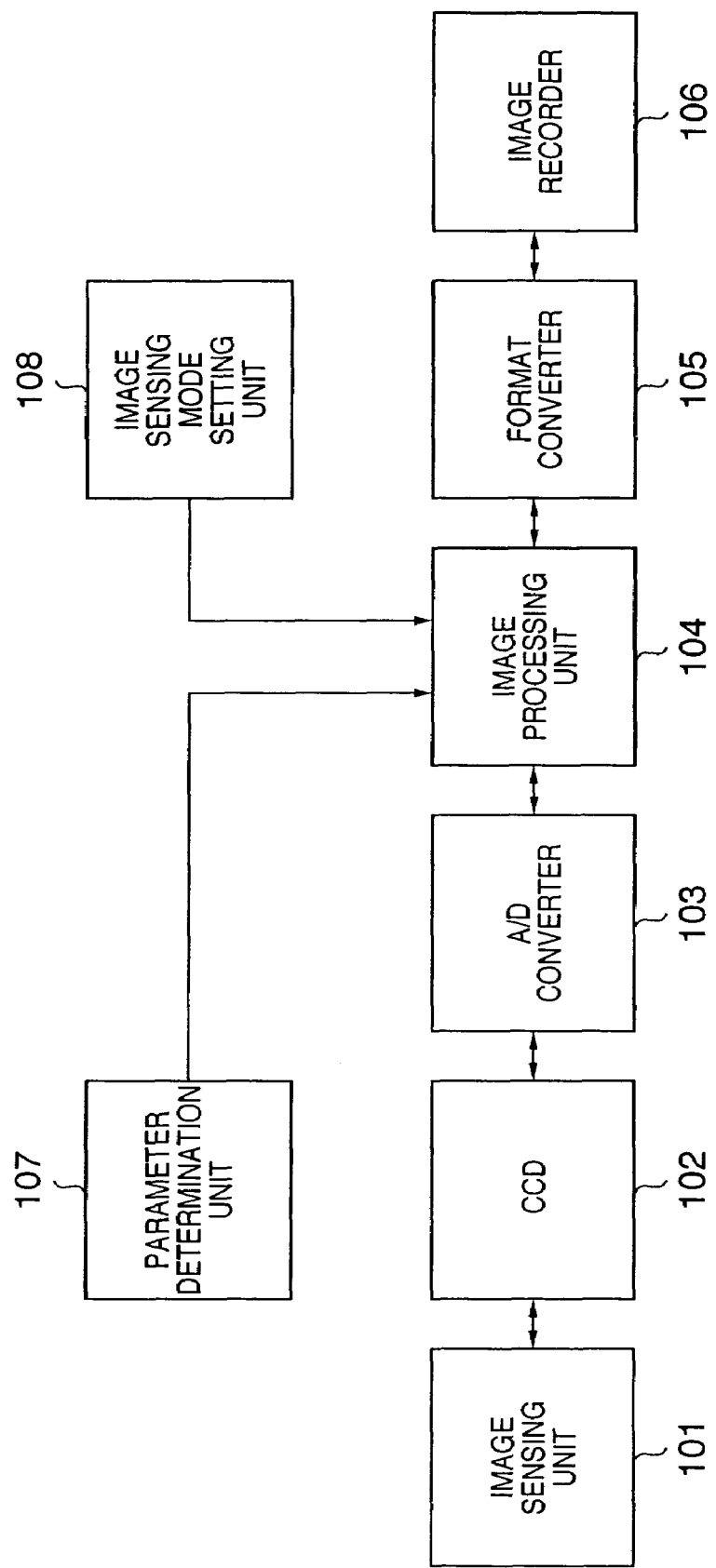
FIG. 1 is a block diagram showing an example of the arrangement of an image sensing apparatus according to the first embodiment.

FIG. 1 is a block diagram showing an example of the arrangement of an image sensing apparatus to which an image processing apparatus of this embodiment is applied. Referring to FIG. 1, an image sensing unit 101 includes a lens system, aperture, and shutter, and forms an object image on the surface of a CCD (image sensing element) 102. Note that a device other than CCD, such as CMOS, can be used as the image sensing element The image formed on the surface of the CCD 102 is photoelectrically converted into an analog signal, which is sent to an A/D converter 103. The A/D converter 103 converts the input analog signal into a CCD digital signal (input image signal).

The CCD digital signal obtained by the A/D converter 103 is sent to an image processing unit 104, which converts the input signal on the basis of image reproduction parameters corresponding to mode information set by an image sensing mode setting unit 108, and outputs an output image signal. The output image signal undergoes format conversion into a JPEG format or the like in a format converter 105. The converted image signal is written in an internal memory of the image sensing apparatus or an external memory such as a compact flash® card or the like by an image recorder 106.

The image sensing mode setting unit 108 sets, in the image processing unit 104, image reproduction parameters corresponding to an image sensing mode designated by the user from a plurality of image sensing modes. When the user customizes image reproduction parameters used in the image processing unit 104, parameters determined by a parameter determination unit 107 are sent to the image processing unit 104 to change the image reproduction parameters set by the image sensing mode setting unit 108. The functions of the respective blocks in the image sensing apparatus have been explained.

Note that the image sensing modes such as a landscape mode, portrait mode, night scene mode, and the like set image reproduction parameters that match image sensing conditions in respective scenes. These modes have different gamma tables and matrix calculation coefficients. In the second embodiment, the modes have different lookup table data in addition to the above parameters. For example, the respective modes have the following setup values: a relatively low saturation level is set in the portrait mode; relatively high contrast and saturation levels are set in the landscape mode; and black-controlled parameters are set in the night scene mode. In addition, a customize mode in which the user can arbitrarily register at least one or more parameters may be prepared.

Figure 2:
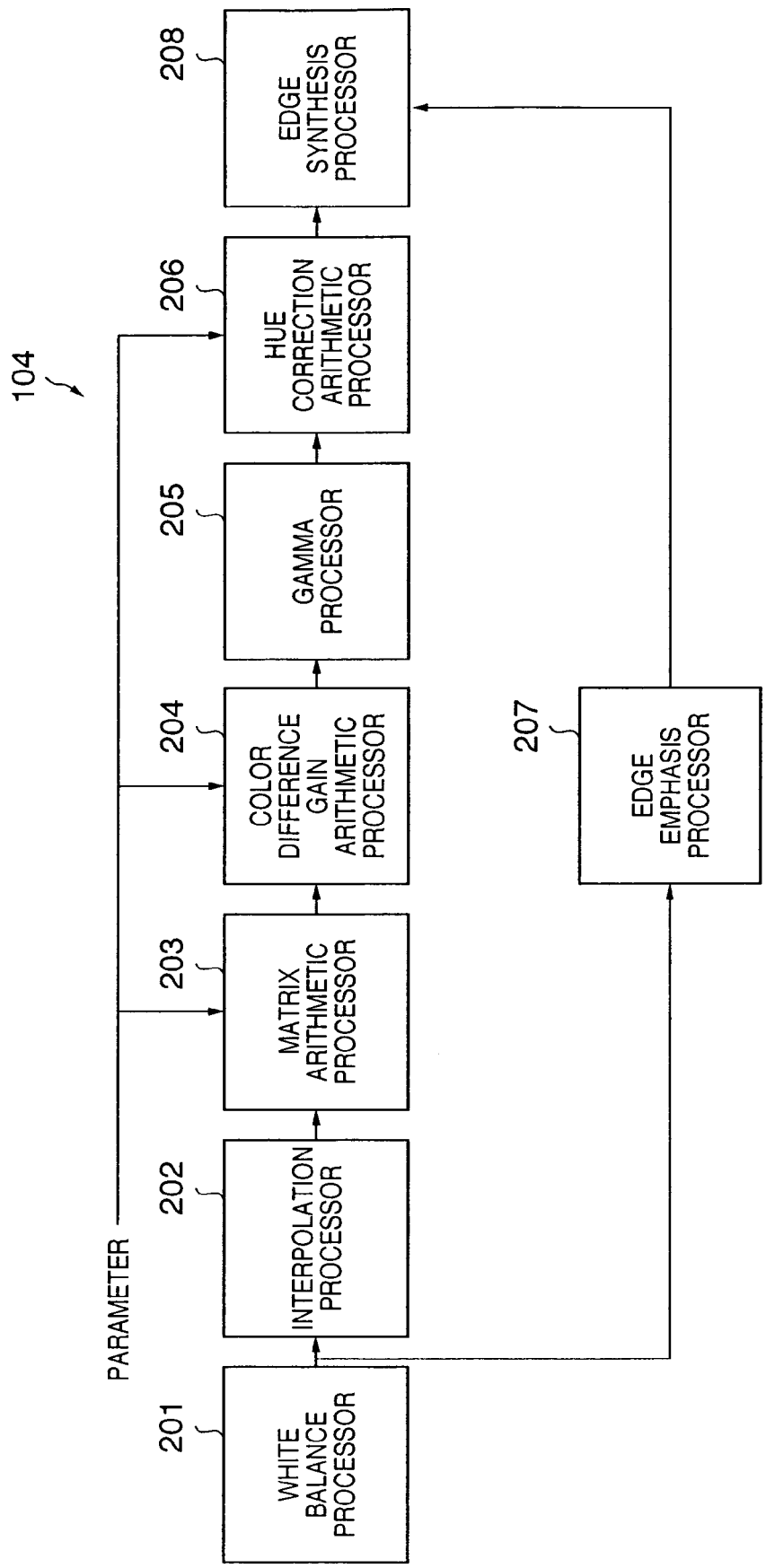
FIG. 2 is a block diagram for explaining the process of an image processing unit according to the first embodiment.

The operation of the image processing unit 104 will be described in detail below. FIG. 2 is a block diagram showing the functional arrangement of the image processing unit 104 in FIG. 1. The flow of the image process in the image sensing apparatus of this embodiment will be explained below using the block diagram of FIG. 2.

The CCD digital signal output from the A/D converter 103 in FIG. 1 is sent to a white balance processor 201 to obtain a white balance coefficient, which can convert white in an image into a white signal, and the color temperature of a light source. By multiplying the CCD digital signal by the obtained white balance coefficient, a white balance process that can convert white in an image into a white signal can be done. The CCD digital signal which has undergone the white balance process is sent to an edge emphasis processor 207 and interpolation processor 202.

Figure 3:
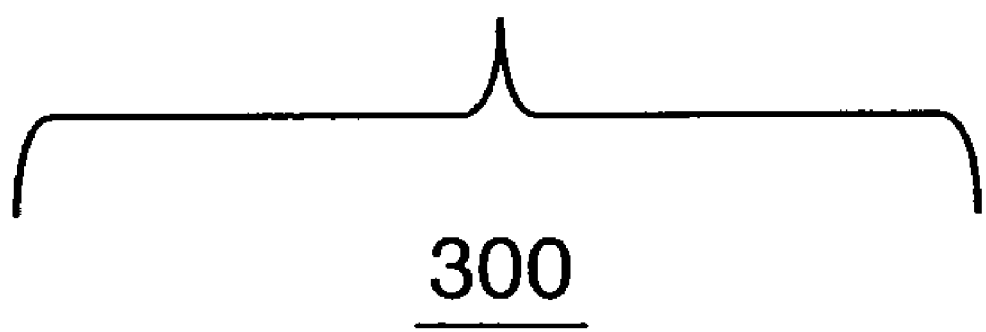
FIG. 3 shows a concept of a CCD digital signal after A/D conversion according to the first embodiment.

The interpolation processor 202 calculates all pixel values for respective color components by interpolation using pixel values (color signal values) at pixel positions R, G1, G2, and B from a pixel layout 300 of a single-plate CCD shown in FIG. 3. That is, the processor 202 generates R, G1, G2, and B plane data 400, as shown in FIG. 4. A matrix arithmetic processor 203 color-converts respective pixels of the plane data 400 using:

$$\begin{vmatrix} Rm \\ Gm \\ Bm \end{vmatrix} = \begin{vmatrix} M11 & M21 & M31 \\ M12 & M22 & M32 \\ M13 & M23 & M33 \end{vmatrix} \begin{vmatrix} R \\ G \\ B \end{vmatrix} \quad (1)$$

for G=(G1+G2)/2

The CCD digital signal which has undergone the matrix arithmetic process in the matrix arithmetic processor 203 is then input to a color difference gain arithmetic processor 204 to multiply color difference signals by gains. This arithmetic operation is attained using the following equations (2) to (4). That is, the signals Rm, Gm, and Bm obtained by equation (1) above are converted into signal values expressed on a color space defined by signals Y, Cr, and Cb by:

$$\begin{vmatrix} Y \\ Cr \\ Cb \end{vmatrix} = \begin{vmatrix} 0.3 & 0.59 & 0.11 \\ 0.7 & -0.59 & -0.11 \\ -0.3 & -0.59 & 0.89 \end{vmatrix} \begin{vmatrix} Rm \\ Gm \\ Bm \end{vmatrix} \quad (2)$$

The signals Cr and Cb are multiplied by gains (gain constant=G1) using:

$$Cr' = G1 \times Cr$$

$$Cb' = G1 \times Cb \quad (3)$$

The signals Y, Cr' (the signal Cr multiplied by the gain), and Cb' (the signal Cb multiplied by the gain) are further converted into signals Rg, Gg, and Bg by:

$$\begin{vmatrix} Rg \\ Gg \\ Bg \end{vmatrix} = \begin{vmatrix} 0.3 & 0.59 & 0.11 \\ 0.7 & -0.59 & -0.11 \\ -0.3 & -0.59 & 0.89 \end{vmatrix}^{-1} \begin{vmatrix} Y \\ Cr' \\ Cb' \end{vmatrix} \quad (4)$$

Note that equation (4) is an inverse matrix operation of equation (2).

The CCD digital signal (Rg, Gg, Bg) that has undergone the aforementioned color difference gain arithmetic process by the color difference gain arithmetic processor 204 is sent to a gamma processor 205. The gamma processor 205 data-converts the CCD digital signal using:

$$Rt = \text{GammaTable}[Rg] \quad (5)$$

$$Gt = \text{GammaTable}[Gg] \quad (6)$$

$$Bt = \text{GammaTable}[Bg] \quad (7)$$

The CCD digital signal (Rg, Gg, and Bg) that has undergone the gamma process is sent to a hue correction arithmetic processor 206. In this arithmetic operation, the signals Rt, Gt, and Bt are converted into signals Y, Cr, and Cb by:

$$\begin{vmatrix} Y \\ Cr \\ Cb \end{vmatrix} = \begin{vmatrix} 0.3 & 0.59 & 0.11 \\ 0.7 & -0.59 & -0.11 \\ -0.3 & -0.59 & 0.89 \end{vmatrix} \begin{vmatrix} Rt \\ Gt \\ Bt \end{vmatrix} \quad (8)$$

Furthermore, the signals Cr and Cb are corrected by:

$$\begin{vmatrix} Cr' \\ Cb' \end{vmatrix} = \begin{vmatrix} H11 & H21 \\ H12 & H22 \end{vmatrix} \begin{vmatrix} Cr \\ Cb \end{vmatrix} \quad (9)$$

Then, the signals Y, Cr' (corrected signal Cr), and Cb' (corrected signal Cb) are converted into signals Rh, Gh, and Bh by:

$$\begin{vmatrix} Rh \\ Gh \\ Bh \end{vmatrix} = \begin{vmatrix} 0.3 & 0.59 & 0.11 \\ 0.7 & -0.59 & -0.11 \\ -0.3 & -0.59 & 0.89 \end{vmatrix}^{-1} \begin{vmatrix} Y \\ Cr' \\ Cb' \end{vmatrix} \quad (10)$$

Note that equation (10) an inverse matrix operation of equation (8). In this way, the CCD digital signal (Rh, Gh, Bh) that has undergone the hue correction arithmetic process in the hue correction arithmetic processor 206 is sent to an edge synthesis processor 208.

On the other hand, the edge emphasis processor 207 detects an edge on the basis of the CCD digital signal which is sent from the white balance processor 201 after the white balance process, so as to extract only an edge signal. The extracted edge signal is amplified by a gain-up process, and is sent to the edge synthesis processor 208. The edge synthesis processor 208 executes an edge synthesis process by adding the edge signal extracted by the edge emphasis processor 207 to the signals Rh, Gh, and Bh sent from the hue correction arithmetic processor 206. The flow of the signal process has been explained.

When the user does not change any parameters, default values of the selected image sensing mode are used as parameters set by the image sensing mode setting unit 108, i.e., parameters M11, M21, M31, . . . , M33 in equation (1), G1 and G2 in equation (3), and H11, H21, H12, and H22 in equation (9). By contrast, when the user changes image reproduction parameters, these default image reproduction parameter values are substituted by those changed and determined by the parameter determination unit 107. The parameter determination process by the parameter determination unit 107 will be described below.

Figure 5:
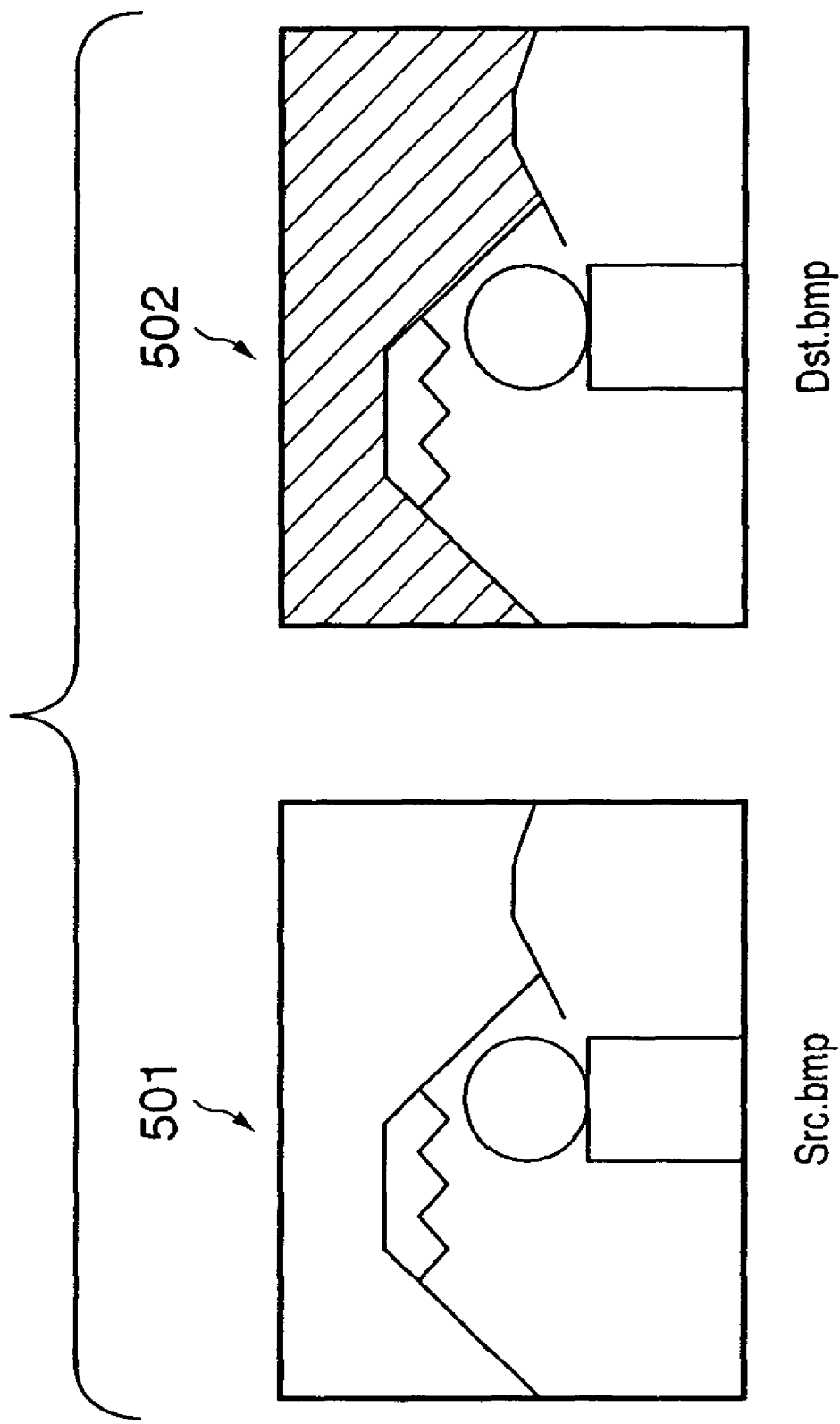
FIG. 5 shows a source image and destination image according to the first embodiment.

Image data 501 in FIG. 5 (an image with a file name Src.bmp in FIG. 5) is conversion source image data (to be also referred to as a source image hereinafter) described in a BMP file format, and can be an arbitrary image prepared by the user. The user retouches this conversion source image data 501 to attain color reproduction of his or her preference. In this case, the user retouches to change only a region to be converted in place of uniformly converting the entire image. Also, parameters to be retouched are not particularly limited (e.g., a hue level, saturation level, or the like may be changed). In this embodiment, only a sky portion is converted into a favorite color. FIG. 5 depicts a destination image generated by retouching as image data 502 (file name Dst.bmp). Note that the image data 501 and 502 have the same size. As the source image data 501, sensed image data obtained by sensing an object image may be used, or thumbnail image data recorded on a recording medium together with the sensed image data may be used.

Figure 8A:
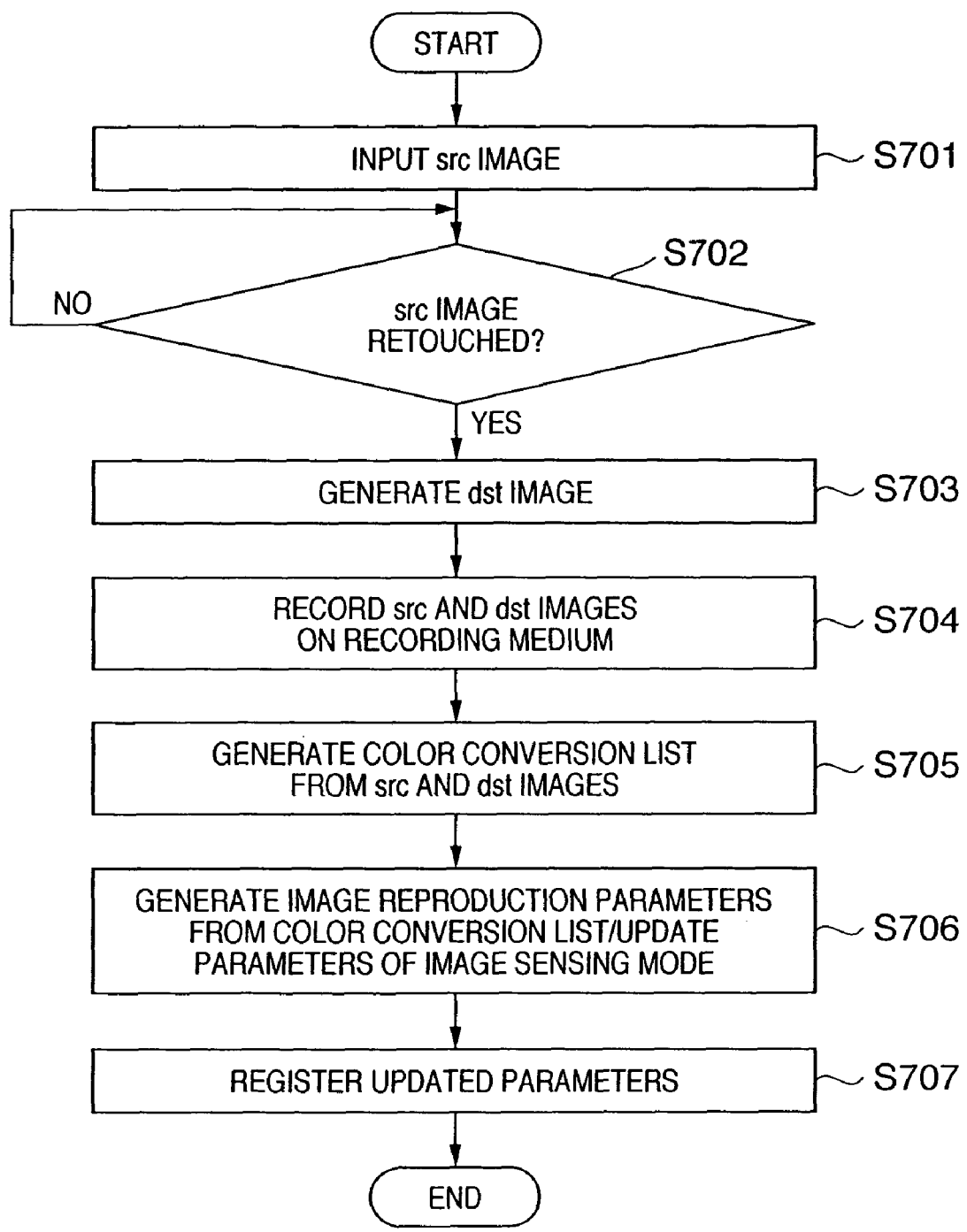
FIG. 8A is a flow chart showing a series of processes using source and destination images.

A series of processes using source and destination images will be briefly described below using the flow chart of FIG. 8A.

The user retouches source image data 501 as a conversion source, which is read out from the internal memory of the image sensing apparatus or a detachable recording medium outside the image sensing apparatus (step S701), while reviewing it on the display unit of the image sensing apparatus (step S702), and saves the obtained image as destination image data 502 (e.g., file name Dst.bmp) after conversion as another file (step S703). The two image data 501 (Src.bmp) and 502 (Dst.bmp) are recorded in the recording medium or internal memory of the image sensing apparatus (step S704). The user designates an image sensing mode whose image reproduction parameters are to be changed, and instructs to execute a parameter change process.

Upon detection of the user's parameter change instruction, the parameter determination unit 107 in FIG. 1 determines parameters on the basis of color signal values of corresponding pixels in the source image data 501 and destination image data 502 (step S705). Parameters determined in this embodiment are M11, M21, M31, ..., M33 in equation (1), G1 and G2 in equation (3), and H11, H21, H12, and H22 in equation (9). The parameters of the image sensing mode are updated by the determined parameters (step S706), and the updated parameters are registered in the internal memory of the image sensing apparatus or the detachable recording medium outside the image sensing apparatus (step S707).

Figure 6:
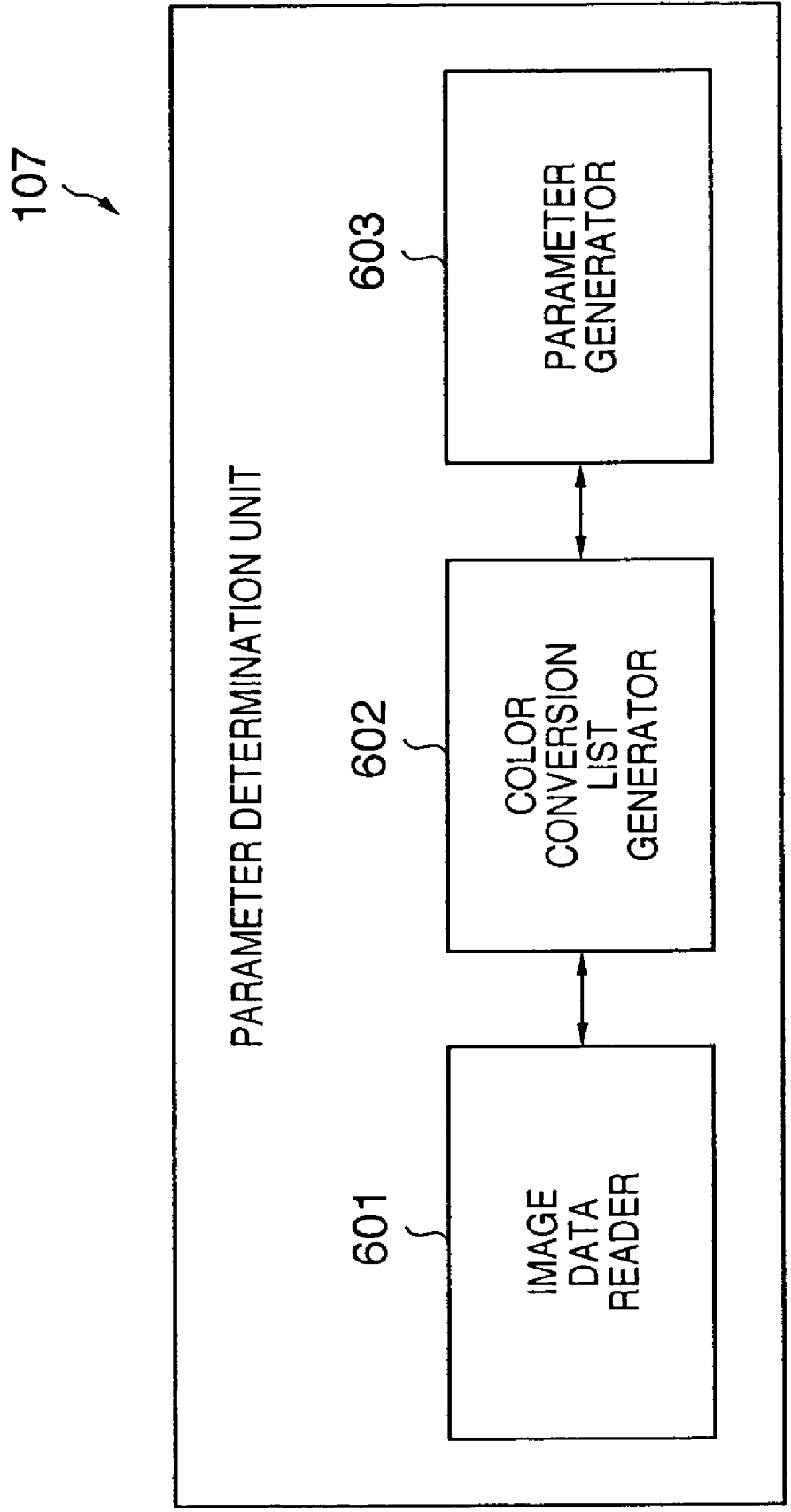
FIG. 6 is a block diagram for explaining the process of a parameter determination unit according to the first embodiment.

FIG. 6 is a block diagram showing an example of the arrangement in the parameter determination unit 107. The operations of the parameter determination unit 107 in step S705 will be explained below using FIG. 6. An image data reader 601 in FIG. 6 reads out the source image data 501 and destination image data 502 stored in a recording medium of the image sensing apparatus. A color conversion list generator 602 generates a color conversion list 700 from the RGB signal values of the source image into those of the destination image, as shown in FIG. 7A, on the basis of the differences between RGB signal values of pixels at identical positions in the readout source image data 501 and destination image data 502.

Figure 7B:
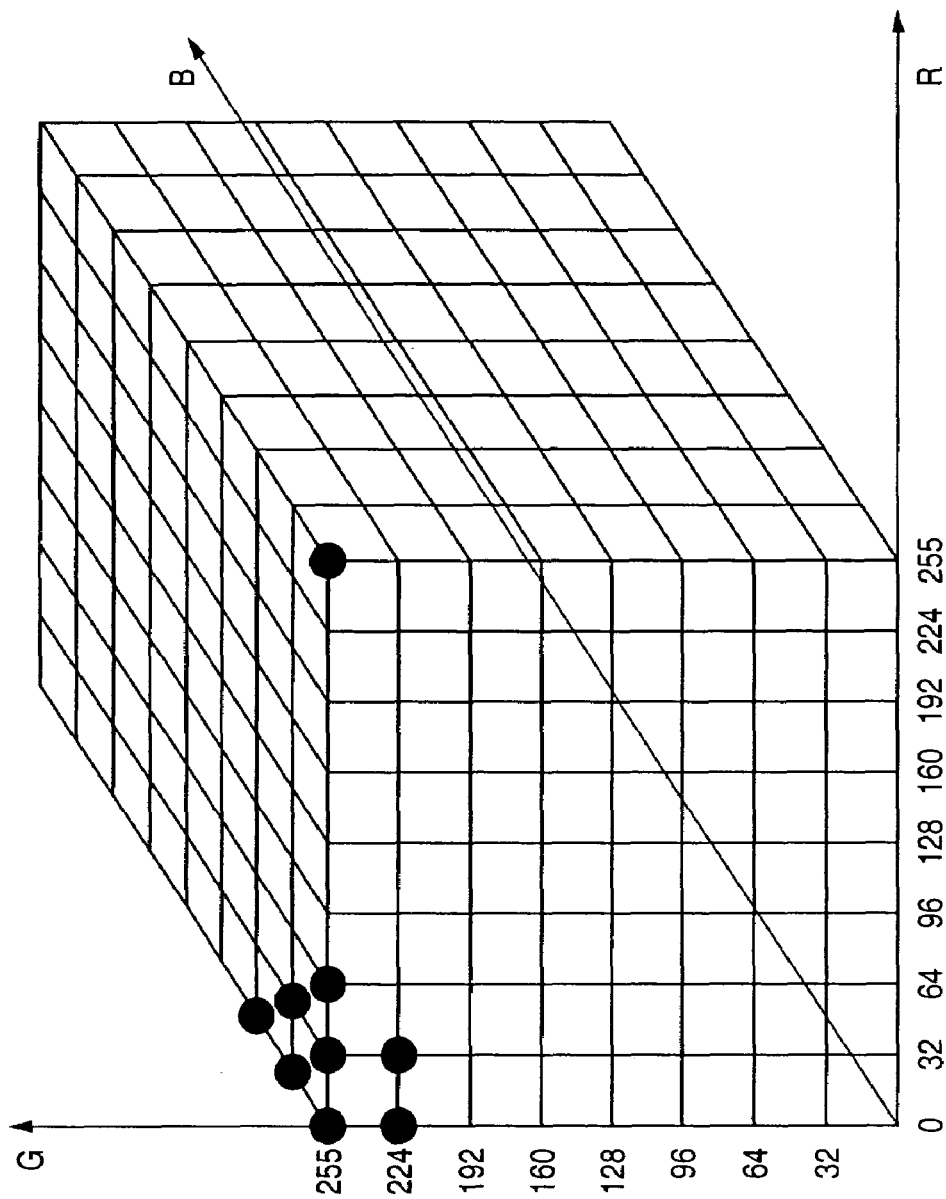
FIG. 7B is a graph for explaining a reference signal according to the first embodiment.

This color conversion list 700 indicates how the RGB signal values of respective grid points, which are set on the RGB color space, as shown in FIG. 7B, change in color conversion from the source image to the destination image. In this embodiment, signal values 0 to 255 (8 bits) on each of the R, G, and B axes are divided into eight in 32-step increments to set 729 (=9×9×9) grid points on the RGB color space. The RGB signal values on the source image side in the color conversion list 700 are those of respective grid points, and the RGB signal values on the destination side correspond to their conversion results. The generation process of the list 700 executed in step S705 in FIG. 8A will be described in detail later using the flow chart of FIG. 8B. The list 700 is generated using the RGB values of pixels in the source image having RGB signal values near grid points and corresponding pixels in the destination image.

A parameter generator 603 determines the parameters to implement conversion of RGB values recorded in the color conversion list 700.

The list generation sequence will be described below in accordance with the flow chart shown in FIG. 8B.

Figure 8B:
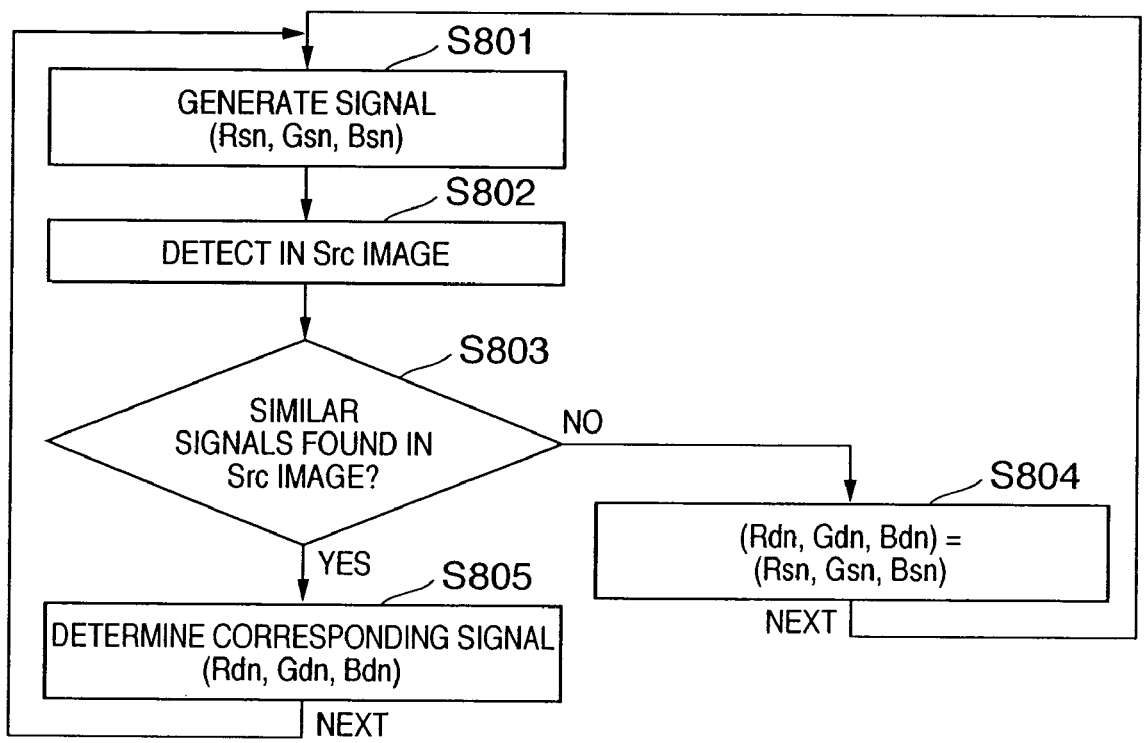
FIG. 8B is a flow chart for explaining a color conversion list generation process according to the first embodiment.

Referring to FIG. 8B, reference signal values are set first. The reference signal values are RGB signal values at each grid point, and signals Rsn (n=0 to 728), Gsn (n=0 to 728), and Bsn (n=0 to 728) are generated (step S801). Note that the setting method of grid points is not limited to the above method (FIG. 7B).

Then, source image signals are searched for RGB signal values near the generated reference signal values (Rsn, Gsn, Bsn), and the found RGB signal values and pixel position are held (step S802). In this search, pixels each having RGB signal values, which satisfy [signal value difference E<predetermined threshold value Th], are extracted, and their RGB signal values and pixel positions are held. The signal value difference E is given by:

$$E = \sqrt{(Rsn - Rs(x,y))^2 + (Gsn - Gs(x,y))^2 + (Bsn - Bs(x,y))^2} \quad (11)$$

where x and y are image coordinate values, and A(x, y) is the value of a signal A at the x- and y-coordinate values. The signal value difference E represents the distance between the reference signal values (Bsn, Gsn, Bsn) on the color space and RGB signal values (Rs, Gs, Bs) in the source image.

It is checked in step S803 if N or more pixels are held in step S802. If it is determined in step S803 that N or more pixels are held in step S802, the flow advances to step S805; otherwise, the flow advances to step S804.

In step S805, signal values corresponding to the reference signal values are calculated in the following sequence. Difference signal values dR, dG, and dB from the RGB signal values of corresponding pixels in the destination image are calculated using the following equations (12) to (14). That is, the differences between the RGB signal values of pixels which are found and held in step S802 and corresponding pixels in the destination image are calculated by:

$$dR = Rs(x, y) - Rd(x, y) \quad (12)$$

$$dG = Gs(x, y) - Gd(x, y) \quad (13)$$

$$dB = Bs(x, y) - Bd(x, y) \quad (14)$$

Then, the average values (average value dRave of dR, average value dGave of dG, and average value dBave of dB) of dR, dG, and dB of all pixels held in step S802 are calculated, and how RGB signal values (Rsn, Gsn, Bsn) at each grid point position in the source image change in the destination image is calculated using these average values and:

$$Rdn = Rsn - dRave \quad (15)$$

$$Gdn = Gsn - dGave \quad (16)$$

$$Bdn = Bsn - dBave \quad (17)$$

On the other hand, if N or more pixels each having the signal value difference E smaller than the threshold value Th are not present in the source image, it is determined that the pixel is noise, and the reference signal values (Rsn, Gsn, Bsn) are directly used as RGB signal values (Rdn, Gdn, Bdn) at a corresponding grid point position in the destination image.

$$Rdn = Rsn \quad (18)$$

$$Gdn = Gsn \quad (19)$$

$$Bdn = Bsn \quad (20)$$

The aforementioned processes are repeated for all grid points (n=0 to 728).

The parameter generator 603 determines parameters to implement color conversion recorded in the color conversion list, which is generated in this way. The generator 603 executes inverse conversion of equations (10) to (1) of RGB signal values (corresponding to reference signal values (signals Rsn, Gsn, and Bsn) on the source image side in the conversion list. In this inverse conversion, parameters of the image sensing mode to be changed are used. Let Rn, Gn, and Bn be the inverse conversion results. Also, let Rdn', Gdn', and Bdn' be results (signal values) obtained by converting these values Rn, Gn, and Bn by equations (1) to (10) using the changed parameters. Then, new parameters of the image sensing mode of interest are determined using the damped-least-square method to minimize a value Diff given by:

$$\text{Diff} = \Sigma \sqrt{(Rdn-Rdn')^2 + (Gdn-Gdn')^2 + (Bdn-Bdn')^2} \quad (21)$$

The parameter generator 603 stores the new parameters, which are calculated from the relationship between the source and destination images in this way, in the internal memory of the image sensing apparatus or a detachable recording medium (not shown) outside the image sensing apparatus as parameters of the image sensing mode, which is designated to change its parameters.

The flow of sensed image data in the parameter-changed image sensing mode will be described below using FIGS. 1 and 2. When the image sensing mode whose parameters have been changed by retouching the source image, as described above, is selected, and an image sensing operation is made, a sensed CCD signal is sent from the image sensing unit 101 to the image processing unit 104 via the A/D converter 103. In the image processing unit 104, the processes from the white balance processor 201 to the edge synthesis processor 208 (FIG. 2) are executed. These processes use the changed parameters read out from the internal memory of the image sensing apparatus or the detachable recording medium outside the image sensing apparatus in place of default parameters prepared in advance.

Image data which has been processed using the changed parameters is sent to the format converter 105, and is converted in accordance with an image format. The converted image data is then written in a recording medium of the image sensing apparatus by the image recorder 106. The flow of data in the parameter-changed image sensing mode has been explained.

As described above, according to this embodiment, new parameters calculated from the relationship between the source and destination images can be held in a recording medium as a parameter-changed image sensing mode. By selecting this parameter-changed image sensing mode, the changed parameters are applied to the subsequent image sensing operations, and sensed images automatically undergo image processes. For this reason, the color appearance of user's preference can be reflected upon sensing images, and sensed images with a common color appearance can be automatically obtained by setting the parameters only once. In this case, information that can specify the parameters, color conversion list, and LUT used to process images in the image sensing operation may be recorded in tag information or the like together with images.

In the above embodiment, parameters of a predetermined image sensing mode are changed, and the changed parameters overwrite those of that image sensing mode. However, the present invention is not limited to this. For example, one or a plurality of image sensing modes (custom modes) which can be customized by the user may be prepared, and the generated parameters may be held as those of one of the custom modes. In this way, the parameters of the image sensing modes prepared in advance can be maintained.

As described above, according to the first embodiment, arbitrary source image data and destination image data obtained by retouching the source image data are recorded, and when the user designates to change image reproduction parameters of a desired image sensing mode, a color conversion list is generated by comparing the source and destination image data, and image reproduction parameters in that image sensing mode are changed using the generated color conversion list. For this reason, favorite color setups of the user can be easily given to an image to be reproduced. Also, only local colors can be easily changed to those of user's preference in place of the entire image.

In the first embodiment, one image sensing mode whose image reproduction parameters are to be rewritten is designated, and the parameters of only the designated image sensing mode are rewritten and registered. Alternatively, the parameters of a plurality of image sensing modes designated by the user may be simultaneously rewritten in place of one mode. In this case, the inverse conversion of equations (10) to (1) is executed using the image reproduction parameters set in the designated image sensing modes. That is, the process of the parameter generator 603 is executed for each of the designated image sensing modes using one color conversion list.

In the first embodiment, the BMP file format is used as the format of the source and destination images. However, the format of the source and destination images is not limited to such specific format. For example, other file formats such as JPEG, TIFF, and the like may be used.

In the first embodiment, since the image sensing apparatus is designed to execute the image processes including the aforementioned parameter determination process, the aforementioned color conversion process can be done upon executing an image sensing process. However, the image sensing apparatus need not always be designed to execute the image processes. For example, an image processing apparatus that executes the image processes may be arranged separately. With this arrangement, the aforementioned color conversion process can be made by inputting arbitrary image data possessed by the user to that apparatus, and favorite color setups of the user can be easily realized.

In this case, for example, image conversion parameters are determined using source and destination images or a color conversion list in place of these images, and image reproduction parameters prepared in advance in the image sensing apparatus are changed using the determined parameters. Then, a registration operation for registering the generated color conversion lists or changed image conversion parameters by assigning names to them is executed. In the registration operation, the color conversion list or color conversion parameters may be registered by designating an image sensing mode whose image reproduction parameters are to be changed, and executing the parameter change process. Alternatively, the image processing apparatus can execute color conversion of arbitrary image data possessed by the user using the registered image conversion parameters. Note that the image conversion parameters correspond to the image reproduction parameters mentioned above. The image processing apparatus may be arranged independently of the image sensing apparatus. If such independent arrangement is adopted, the generated image reproduction parameters are transferred to the image sensing apparatus via an interface such as USB or the like.

Second Embodiment

Figure 9:
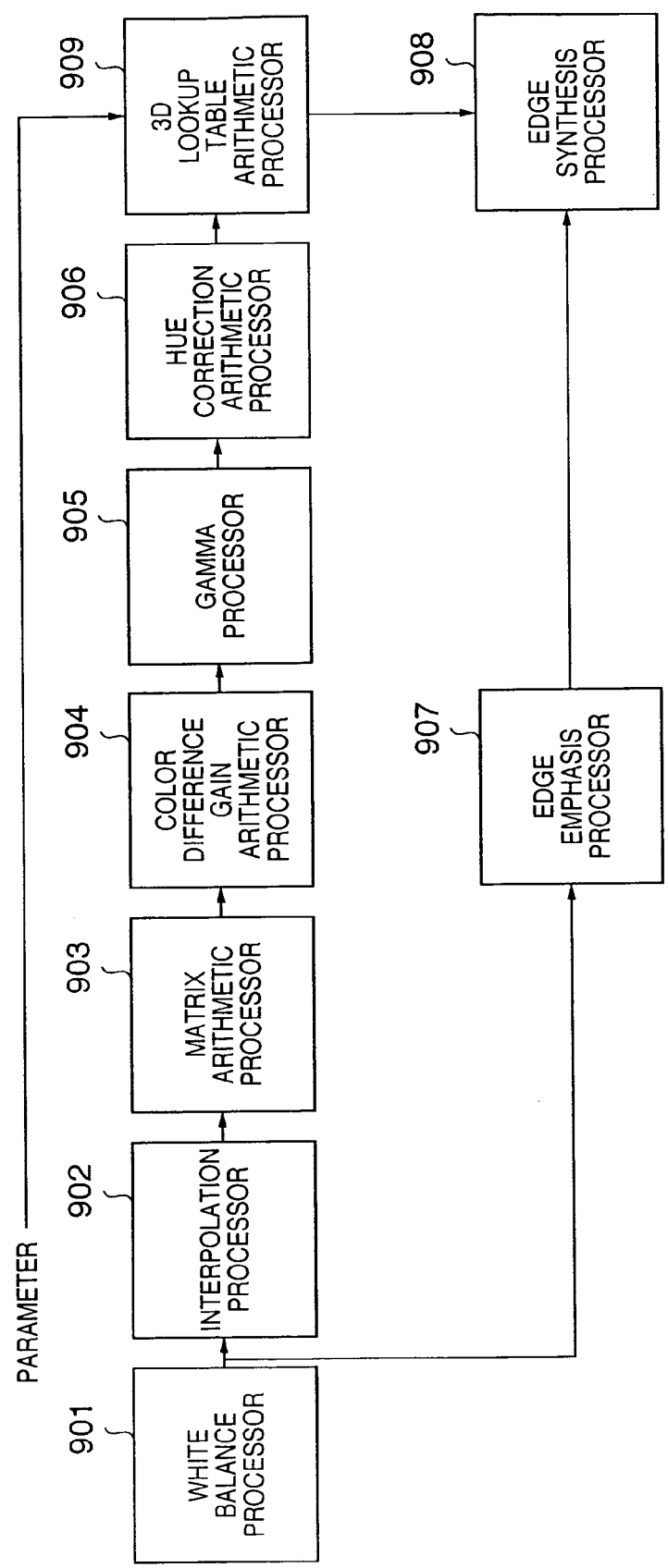
FIG. 9 is a block diagram for explaining the process of an image processing unit according to the second embodiment.

The second embodiment of the present invention will be described below. In the first embodiment, image reproduction parameters given by equations (1), (3), and (9) are changed on the basis of the generated color conversion list. In the second embodiment, lookup table values (grid point data) in a 3D lookup table arithmetic processor 909 shown in FIG. 9 are changed. FIG. 9 is a block diagram for explaining the processes included in the image processing unit 104 according to the second embodiment. The flow of image processes in the image sensing apparatus of this embodiment will be described below using the block diagram of FIG. 9.

Since the functions of a white balance processor 901, interpolation processor 902, matrix arithmetic processor 903, color difference gain arithmetic processor 904, gamma processor 905, hue correction arithmetic processor 906, edge emphasis processor 907, and edge synthesis processor 908 are the same as those in the first embodiment described above, a detailed description thereof will be omitted. In this embodiment, a 3D lookup table arithmetic processor 909, which is not equipped in the first embodiment, will be described in detail below.

CCD digital signals (input RGB signals) Rh, Gh, and Bh output from the hue correction arithmetic processor 906 are sent to the 3D lookup table arithmetic processor 909, which converts the input signals into CCD digital signals (output RGB signals) RL, GL, and BL using a 3D lookup table.

A 3D lookup table arithmetic operation will be briefly described below. Note that the following description will be given using an RGB 3D lookup table. However, a multidimensional lookup table may be used in correspondence with signals to be processed.

In this embodiment, in order to reduce the size of the 3D lookup table, 729 (=9×9×9) 3D representative grid points (lookup table) obtained by dividing the range from minimum to maximum values of each of R, G, and B signals into nine are prepared, and RGB signals other than those at representative grid points are calculated by interpolation.

The interpolation arithmetic operation is described by:

$R = Ri + Rf$ $G = Gi + Gf$ $B = Bi + Bf$ $Rout(R,G,B) = Rout(Ri+Rf,Gi+Gf,Bi+Bf) = (Rout(Ri,Gi,Bi)\times(Step-Rf)\times(Step-Gf)\times(Step-Bf)+Rout(Ri+Step,Gi,Bi)\times(Rf)\times(Step-Gf)\times(Step-Bf)+Rout(Ri,Gi+Step,Bi)\times(Step-Rf)\times(Gf)\times(Step-Bf)+Rout(Ri,Gi,Bi+Step)\times(Step-Rf)\times(Step-Gf)\times(Bf)+Rout(Ri+Step,Gi+Step,Bi)\times(Rf)\times(Gf)\times(Step-Bf)+Rout(Ri+Step,Gi,Bi+Step)\times(Rf)\times(Step-Gf)\times(Bf)+Rout(Ri,Gi+Step,Bi+Step)\times(Step-Rf)\times(Gf)\times(Bf)+Rout(Ri+Step,Gi+Step,Bi+Step)\times(Rf)\times(Gf)\times(Bf))/(Step\times Step\times Step)$ (22)

$Gout(R,G,B) = Gout(Ri+Rf,Gi+Gf,Bi+Bf) = (Gout(Ri,Gi,Bi)\times(Step-Rf)\times(Step-Gf)\times(Step-Bf)+Gout(Ri+Step,Gi,Bi)\times(Rf)\times(Step-Gf)\times(Step-Bf)+Gout(Ri,Gi+Step,Bi)\times(Step-Rf)\times(Gf)\times(Step-Bf)+Gout(Ri,Gi,Bi+Step)\times(Step-Rf)\times(Step-Gf)\times(Bf)+Gout(Ri+Step,Gi+Step,Bi)\times(Rf)\times(Gf)\times(Step-Bf)+Gout(Ri+Step,Gi,Bi+Step)\times(Rf)\times(Step-Gf)\times(Bf)+Gout(Ri,Gi+Step,Bi+Step)\times(Step-Rf)\times(Gf)\times(Bf)+Gout(Ri+Step,Gi+Step,Bi+Step)\times(Rf)\times(Gf)\times(Bf))(Step\times Step\times Step)$ (23)

$Bout(R,G,B) = Bout(Ri+Rf,Gi+Gf,Bi+Bf) = (Bout(Ri,Gi,Bi)\times(Step-Rf)\times(Step-Gf)\times(Step-Bf)+Bout(Ri+Step,Gi,Bi)\times(Rf)\times(Step-Gf)\times(Step-Bf)+Bout(Ri,Gi+Step,Bi)\times(Step-Rf)\times(Gf)\times(Step-Bf)+Bout(Ri,Gi,Bi+Step)\times(Step-Rf)\times(Step-Gf)\times(Bf)+Bout(Ri+Step,Gi+Step,Bi)\times(Rf)\times(Gf)\times(Step-Bf)+Bout(Ri+Step,Gi,Bi+Step)\times(Rf)\times(Step-Gf)\times(Bf)+Bout(Ri,Gi+Step,Bi+Step)\times(Step-Rf)\times(Gf)\times(Bf)+Bout(Ri+Step,Gi+Step,Bi+Step)\times(Rf)\times(Gf)\times(Bf))(Step\times Step\times Step)$ (24)

where R, G, and B are input RGB signals, Rout(R,G,B), Gout(R,G,B), and Bout(R,G,B) are output RGB signals at that time. Also, Ri, Gi, and Bi are signals at a representative grid point, which are smaller than and nearest to the signal values of the input RGB signals R, G, and B. Furthermore, Rout(Ri,Gi,Bi), Gout(Ri,Gi,Bi), and Bout(Ri,Gi,Bi) are representative grid point output signals, and Step is the step width (=32 in this embodiment) at a representative grid point.

Assume that these lookup table conversion and interpolation formulas (22), (23), and (24) are simply described by:

$(Rout, Gout, Bout) = LUT[(R, G, B)]$ (25)

where R, G, and B are input signal values, LUT is a 9×9×9 lookup table, and Rout, Gout, and Bout are lookup table conversion and interpolation results.

Using the aforementioned arithmetic operations, input RGB signals Rh, Gh, and Bh are converted into output RGB signals RL, GL, and BL by:

$(RL, GL, BL) = LUT[(Rh, Gh, Bh)]$ (26)

The signals which have undergone the 3D lookup table conversion and interpolation operations are sent to the edge synthesis processor 908. The edge synthesis processor 908 adds an edge signal extracted by the edge emphasis processor 907 to the output RGB signals (RL, GL, BL) sent from the 3D lookup table arithmetic processor 909. The flow of the image process arithmetic operations according to the second embodiment has been explained.

When the user does not change any parameters, default values of image reproduction parameters set in advance in correspondence with the selected image sensing mode are used as M11, M21, M31, . . . , M33 in equation (1), G1 and G2 in equation (3), H11, H21, H12, and H22 in equation (9), and respective values of the lookup table LUT of equation (26).

In the second embodiment, when the user changes parameters, lookup table grid point data of equation (26) are determined, and only the lookup table grid point data are substituted. The parameter conversion operation will be described below. When the color conversion list 700 is generated, lookup table grid point data are determined on the basis of the color conversion list 700. In the parameter change process of this embodiment, since the same processes as in the first embodiment are executed until generation of the color conversion list 700, a detailed description thereof will be omitted. After the color conversion list 700 is generated, 3D lookup table grid point data are determined on the basis of the color conversion list 700. Note that the 3D lookup table grid point data are determined using the color conversion list 700, and a default lookup table, which is set in advance in the image sensing apparatus.

Initially, a 3D lookup table LUTlist used to convert a source image signal into a destination image signal is generated based on the color conversion list 700. The 3D lookup table conversion and interpolation processes of this color conversion list are done using:

$$(Rdn, Gdn, Bdn) = \text{LUTlist}[(Rsn, Gsn, Bsn)] \quad (27)$$

When color conversion based on the color conversion list is reflected onto 3D lookup table conversion of the image sensing apparatus, it is described by:

$$(RL', GL', BL') = \text{LUTlist}[\text{LUT}[(Rh, Gh, Bh)]] \quad (28)$$

Since the default lookup table and the lookup table based on the color conversion list can be merged into one lookup table, equation (28) can be rewritten to a single lookup table given by:

$$(RL', GL', BL') = \text{LUTcustm}[(Rh, Gh, Bh)] \quad (29)$$

The new lookup table LUTcustm obtained by merging the two lookup tables (LUT, LUTlist) is substituted as the 3D lookup table of the image sensing mode of user's choice, whose parameters of the image sensing apparatus are to be changed.

As described above, according to the second embodiment, arbitrary source image data and destination image data obtained by retouching the source image data are recorded. When the user designates an image sensing mode whose parameters are to be changed, and also designates to execute the parameter change process, a color conversion list is generated by comparing the source and destination image data, 3D lookup table grid point data are determined based on the generated color conversion list, and the determined 3D lookup table grid point data are used as those in the designated image sensing mode. Hence, favorite color setups of the user can be easily given to an image to be reproduced. Also, since only the lookup table grid points whose colors are to be changed are changed, only local colors can be easily changed to those of user's preference in place of the entire image.

That is, when the image sensing mode is to be customized using parameters of the matrix arithmetic operation, color difference gain arithmetic operation, gamma process, hue correction arithmetic process, and the like as in the first embodiment, if the user wants to change only a specific color, it is impossible to change only that color. However, when the 3D lookup table is used as in this embodiment, only a specific color can be changed without changing other colors.

In this embodiment, the source and destination images are recorded on the recording medium of the image sensing apparatus, which internally generates a color conversion list and determines parameters based on the generated color conversion list, as in the first embodiment. Alternatively, a color conversion list may be generated in advance using a personal computer, the color conversion list may be directly recorded on a recording medium, and parameters may be determined based on that color conversion list.

Third Embodiment

In the first embodiment, the color conversion list 700 is generated using the RGB signal values of corresponding pixels in images before and after the retouch process. In the third embodiment, a color conversion list is generated using the RGB signal values of a pair of pixels designated by the user. Note that the image reproduction parameters described in the first embodiment can be changed or the lookup table described in the second embodiment can be generated or updated on the basis of the color conversion list generated in the third embodiment.

The generation process of the color conversion list 700 according to the third embodiment will be described below.

Figure 10:
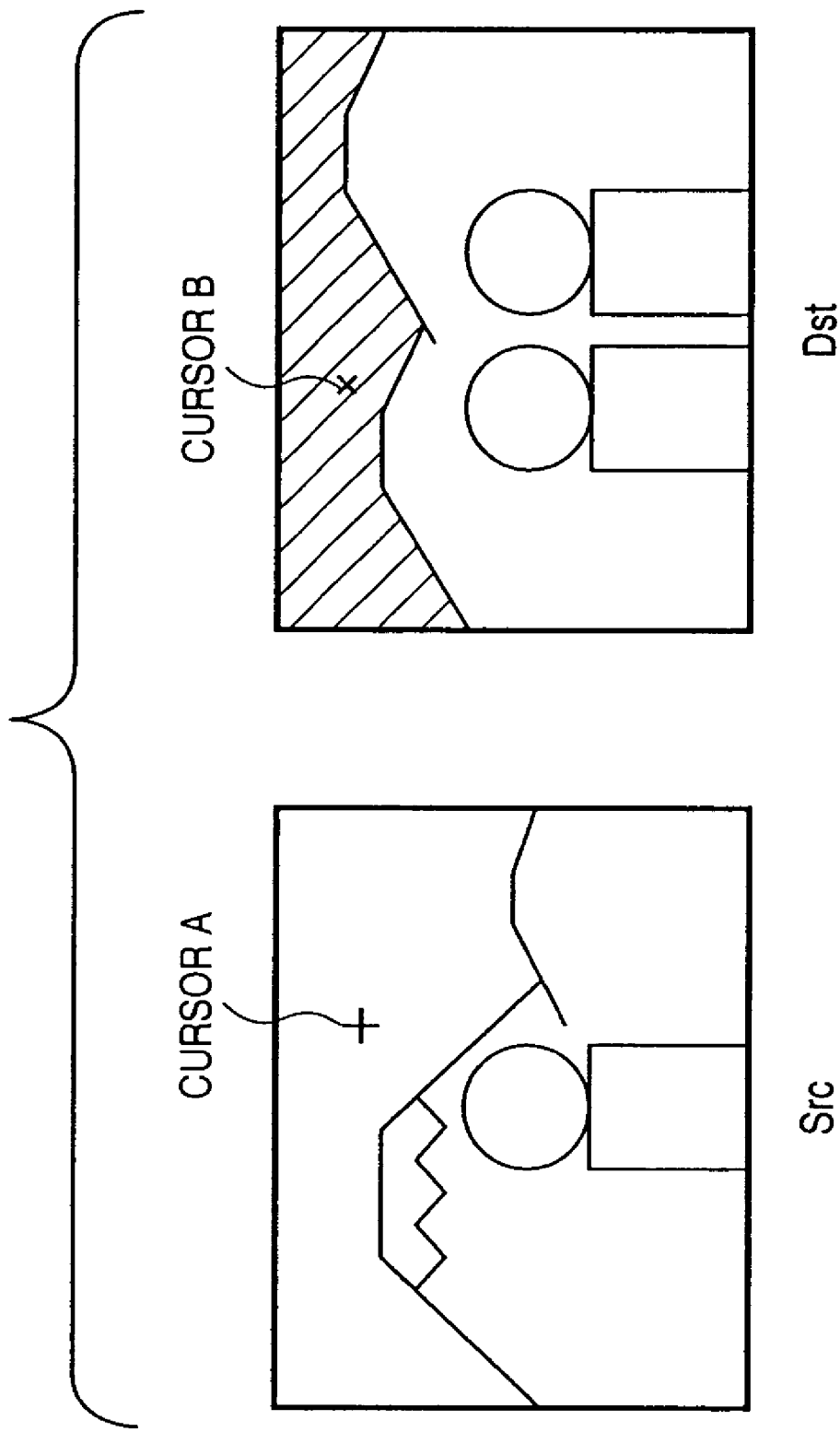
FIG. 10 is a view for explaining a method of designating a source color and destination color according to the third embodiment.

Images shown in FIG. 10 include a source image 1001 prepared to designate a first color as a conversion source, and a destination image 1002 prepared to designate a second color as a conversion target color of the first color. The user prepares for these two images, which may be those sensed by an image sensing apparatus different from that of this embodiment, or those which are generated by the user by retouching. The formats of the source and destination images are not particularly limited as long as the image sensing apparatus of this embodiment is compatible. For example, JPEG, TIFF, GIF, and the like may be used. The source and destination images may have different sizes. Also, the source and destination images may use sensed image data obtained upon sensing an image or thumbnail image data recorded on a recording medium together with the sensed image data. The sensed image data may be RAW data, which is obtained by A/D-converting an output signal from an image sensing element and converting digital data to a predetermined format with or without reversible compression.

The user records the two images in a recording medium of the image sensing apparatus, and starts parameter determination. The parameter determination process is done by the parameter determination unit 107 in FIG. 1. FIG. 11 is a block diagram showing the functional arrangement of the parameter determination unit 107 according to the third embodiment. The operation of the parameter determination unit 107 according to the third embodiment will be described below using FIG. 11.

An image data reader 1601 reads out the source and destination image data stored in a recording medium of the image sensing apparatus. The readout image data are displayed on an image display unit of the image sensing apparatus, although not shown. The user designates a source color as a conversion source in the source image displayed on the image display unit by moving cursor A, as shown in FIG. 10. Likewise, the user designates a destination color as a conversion target of the source color from the destination image by moving cursor B. If there are a plurality of source colors to be converted, the user designates the next source color in the source image, and a destination color as a conversion target of that source color in the destination image. As a color designated by the cursor A or the cursor B, value of the color of one pixel specified with the cursor can be used. Alternatively, mean value of the color of the pixel of neighborhood at the position specified with the cursor can may be used as the designated color. With this color designation operation, a designated conversion color list shown in FIG. 12 is generated. The designated conversion color list is registered with pairs of RGB signal values (Rs(i), Gs(i), Bs(i)) of source colors and RGB signal values (Rd(i), Gd(i), Bd(i)) of destination colors designated as conversion targets of the source colors. Let C be the number of colors to be converted set by the user (the number of pairs of colors). Then, i=0 to C−1.

After the designated conversion color list is generated in this way, it is sent to a color conversion list generator 1603. The color conversion list generator 1603 generates the color conversion list 700, which has been explained in the first embodiment, on the basis of the designated conversion color list. A parameter generator 1604 updates image reproduction parameters (M11, M21, M31, . . . , M33, G1, G2, H11, H21, H12, H22, or lookup table values) by the method described in the first or second embodiment on the basis of the contents of the generated color conversion list 700.

Figure 13:
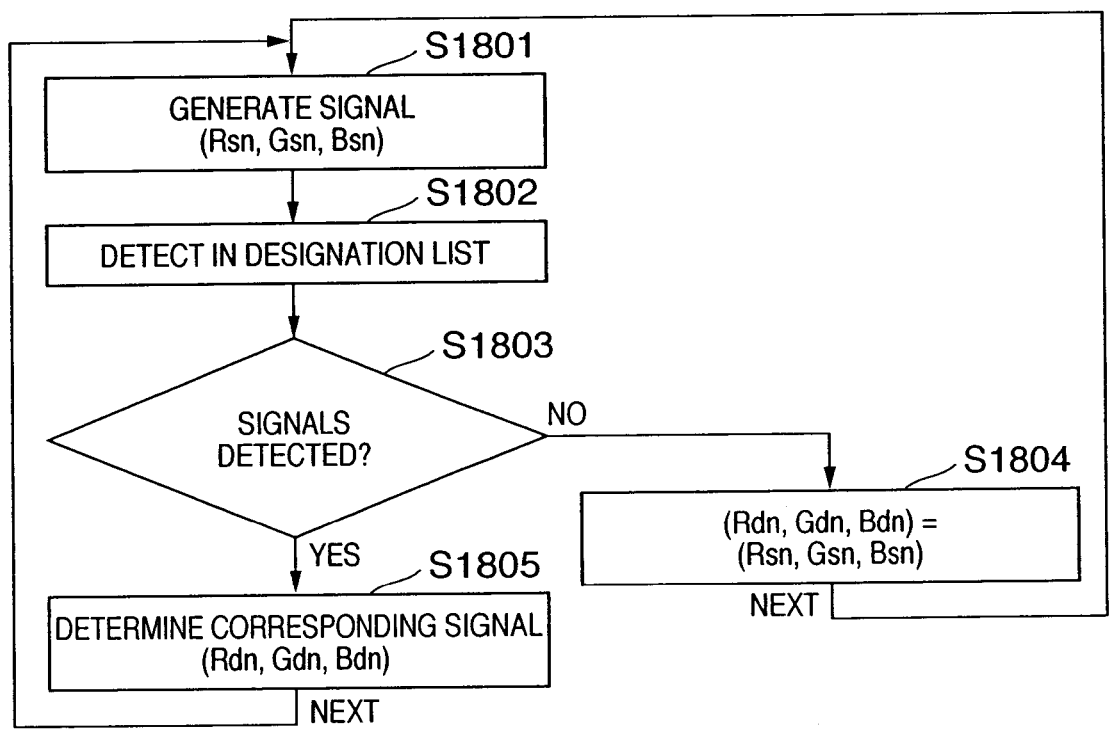
FIG. 13 is a flow chart for explaining a designated conversion color list generation process according to the third embodiment.

The sequence for generating parameters based on the color conversion list will be described below with reference to the flow chart of FIG. 13.

In step S1801, reference signal values Rsn, Gsn, and Bsn are generated. These reference signal values are the same as those described in the first embodiment with reference to FIG. 7B. In step S1802, the designated conversion color list is searched for RGB signal values near the reference signal values generated in step S1801. In this search process, a signal value difference E is calculated for each of source colors i=0 to C−1 using:

$$E=\sqrt{(Rs(i)-Rsn)^2+(Gs(i)-Gsn)^2+(Bs(i)-Bsn)^2} \quad (30)$$

Then, RGB signal values which satisfy [signal value difference<threshold value Th] are extracted.

If the RGB signal values of one or more colors are extracted in step S1802, the flow advances to step S1805 to calculate color signal values corresponding to the reference signal values after conversion in the following sequence. That is, difference signals dR, dG, and dB between the RGB signal values of the extracted source color and those of a destination color recorded in the designated conversion color list as a pair of that source color are calculated:

$$dR=Rs(i)-Rd(i) \quad (31)$$

$$dG=Gs(i)-Gd(i) \quad (32)$$

$$dB=Bs(i)-Bd(i) \quad (33)$$

where Rs(i), Gs(i), and Bs(i) are the RGB signal values of the extracted source color, and Rd(i), Gd(i), and Bd(i) are those of a destination color corresponding to that source color.

The average value dRave of dR, the average value dGave of dG, and the average value dBave of dB of extracted signals are calculated, and signal values Rdn, Gdn, and Bdn after color conversion corresponding to Rsn, Gsn, and Bsn are calculated by arithmetic operations with the reference signal values Rsn, Gsn, and Bsn:

$$Rdn=R(n)-dRave \quad (34)$$

$$Gdn=G(n)-dGave \quad (35)$$

$$Bdn=B(n)-dBave \quad (36)$$

If no RGB signal values which satisfy [signal value difference E<threshold value Th] are found, the flow advances from step S1803 to step S1804 to calculate Rdn, Gdn, and Bdn by:

$$Rdn=Rsn \quad (37)$$

$$Gdn=Gsn \quad (38)$$

$$Bdn=Bsn \quad (39)$$

By repeating the aforementioned process for n=0 to 728, the color conversion list is generated. Based on the color conversion list generated in this way, the image reproduction parameters or 3D lookup table values are generated. A lookup table, which is set in advance, may be updated by overwriting it by the generated lookup table.

Figure 14:
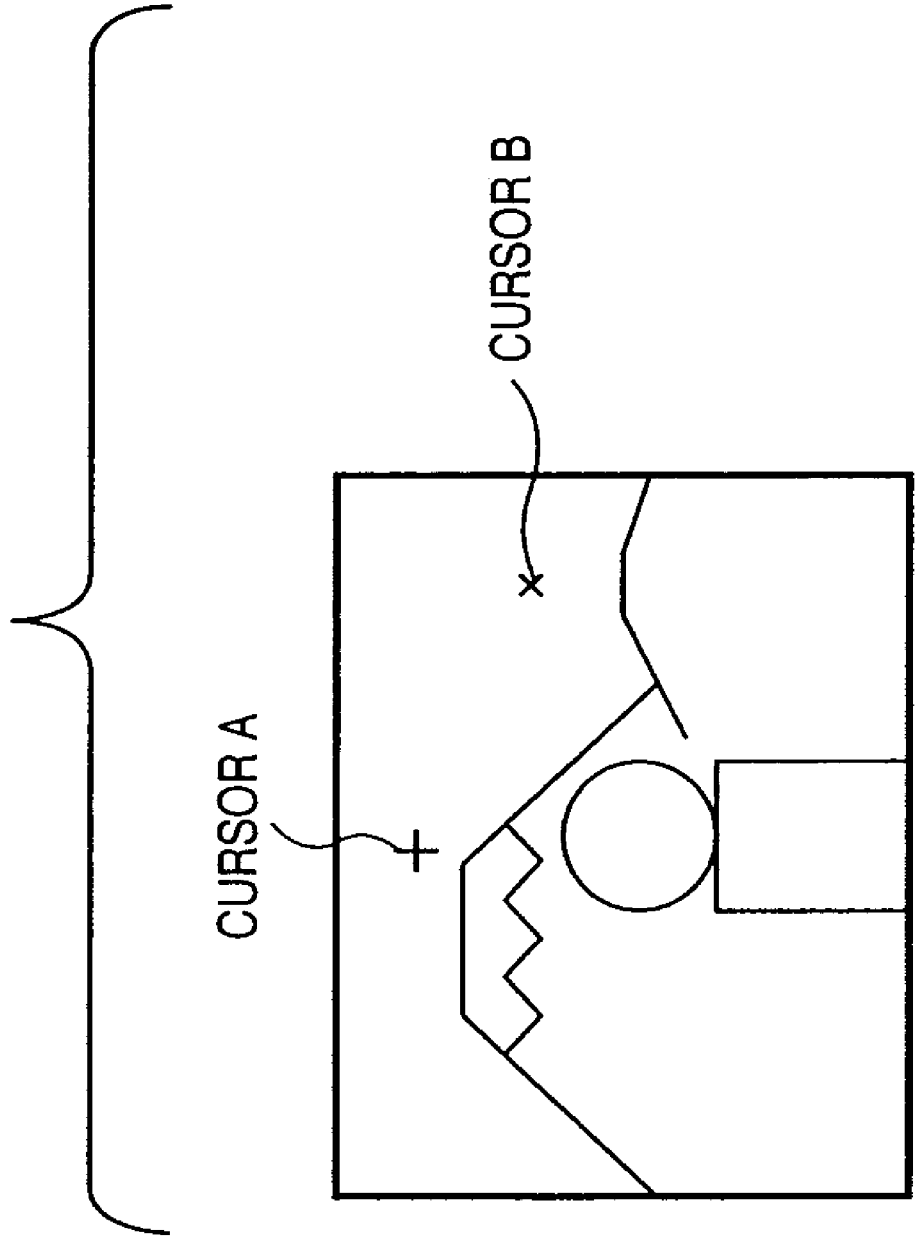
FIG. 14 is a view for explaining another example of a designation method of a source color and destination color according to the third embodiment.

In the third embodiment, upon generating the color conversion list, two images, i.e., source and destination images are used. Alternatively, as shown in FIG. 14, a pair of source and destination colors may be designated from a single image. Furthermore, a pair of source and destination colors may be designated from three or more images. The parameters of the 3D lookup table in this embodiment have 729 grid points in 32-step increments. However, the present invention is not limited to this, and any other grid point intervals may be used.

As described above, according to the third embodiment, upon setting color reproduction of user's preference, since the user designates a source color as a conversion source color, and a destination color as a target color after conversion, favorite color setups of the user of the image sensing apparatus can be easily realized. Since color conversion is made using the 3D lookup table in place of parameters that influence the entire image, only local colors can be easily converted into favorite colors.

In the first to third embodiments, source and destination images expressed by RGB signals have been explained. However, the present invention is not limited to the RGB signals, and CMYG signals may be used. When CMYG signals are used, the above embodiments may be modified to use a four-dimensional lookup table. Also, YCrCb signals, L*a*b* signals, and the like may be used.

In the first to third embodiments, image reproduction parameters generated based on source and destination images, or a color conversion list or lookup table generated based on the parameters can be recorded in the internal memory of the image sensing apparatus or a detachable recording medium. Upon recording, since a plurality of color conversion lists and the like may be recorded, it is preferable to register these lists by assigning names to them. When a plurality of custom modes that can respectively register different color conversion lists, image conversion parameters, or lookup tables are prepared, or when a custom mode can register a plurality of different color conversion lists, image conversion parameters, or lookup tables, a list of registered ones is displayed on the display unit of the image sensing apparatus, as shown in FIG. 24.

When the user selects an image sensing mode upon image sensing, a list of a plurality of registered, updated color conversion lists and the like is displayed, and the user selects a preferred one of these lists and the like. Such process need not always be executed upon image sensing. For example, even after the image sensing operation, the user may select a sensed image to be converted stored in a detachable recording medium, and then select a registered color conversion list or the like, so as to apply color conversion to the selected sensed image.

Fourth Embodiment

In the second and third embodiments, the lookup table is updated based on the color conversion list to execute desired color conversion. However, as described in the background of the invention, when the lookup table values are directly changed, color discontinuity may appear. In the fourth to sixth embodiments to be described hereinafter, an arrangement that can prevent such drawback will be explained. Therefore, limitations associated with changes in lookup table value according to the fourth to sixth embodiments can be applied to the lookup table change process according to the second and third embodiments.

Figure 15:
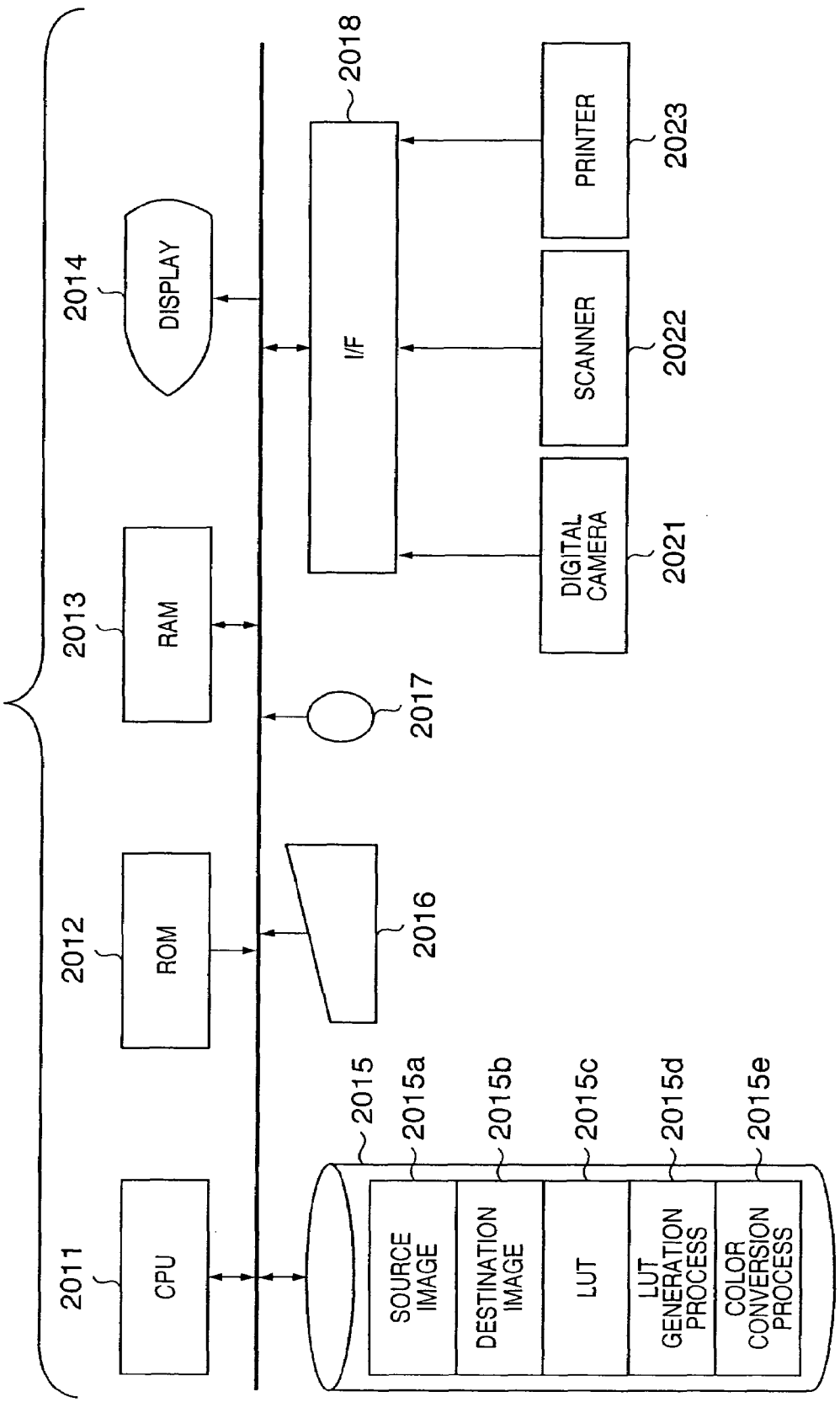
FIG. 15 is a block diagram showing the arrangement of an information processing apparatus which generates a color conversion table (to be referred to as a lookup table hereinafter), and executes a color conversion process using the lookup table according to the fourth embodiment.

FIG. 15 is a block diagram showing the arrangement of an information processing apparatus which generates a color conversion table (to be referred to as a lookup table hereinafter), and executes a color conversion process using the lookup table according to the fourth embodiment.

Referring to FIG. 15, reference numeral 2011 denotes a CPU which implements various processes by executing a program stored in a ROM 2012 or a control program loaded onto a RAM 2013. Reference numeral 2012 denotes a ROM which stores a boot processing program executed upon starting up the information processing apparatus, and various data. Reference numeral 2013 denotes a RAM which serves as a main memory of the CPU 2011. Reference numeral 2014 denotes a display which makes various kinds of display under the control of the CPU 2011. The display 2014 comprises a CRT or LCD. Reference numeral 2015 denotes an external storage device, which comprises, e.g., a hard disk. The external storage device 2015 stores a source image 2015a, destination image 2015b, lookup table 2015c, lookup table generation processing program 2015d, and color conversion processing program 2015e. The contents of respective data and processing programs will become apparent from the following description.

Reference numeral 2016 denotes a keyboard; and 2017, a pointing device. The user makes various operation inputs to the information processing apparatus using these input devices. Reference numeral 2018 denotes an interface to which peripheral devices are connected. In this embodiment, a digital camera 2021, scanner 2022, printer 2023, and the like are connected as the peripheral devices.

An outline of the color conversion process according to this embodiment will be described below. An image input from an image input device such as the digital camera 2021, scanner 2022, or the like is stored as the source image 2015a in the external storage device 2015. The destination image 2015b is generated by retouching the source image 2015a using a separately prepared application. When the CPU 2011 executes the lookup table generation processing program 2015d, the lookup table 2015c is generated on the basis of a change amount of corresponding pixels between the source and destination images 2015a and 2015b. At this time, if the change amount is extremely large, that change amount is limited, and the lookup table is generated based on the limited change amount.

After that, by executing the color conversion processing program 2015e, a desired input image can undergo color conversion with reference to the lookup table 2015c, thus obtaining an output image. The lookup table generation process and color conversion process will be described in detail below.

Figure 16:
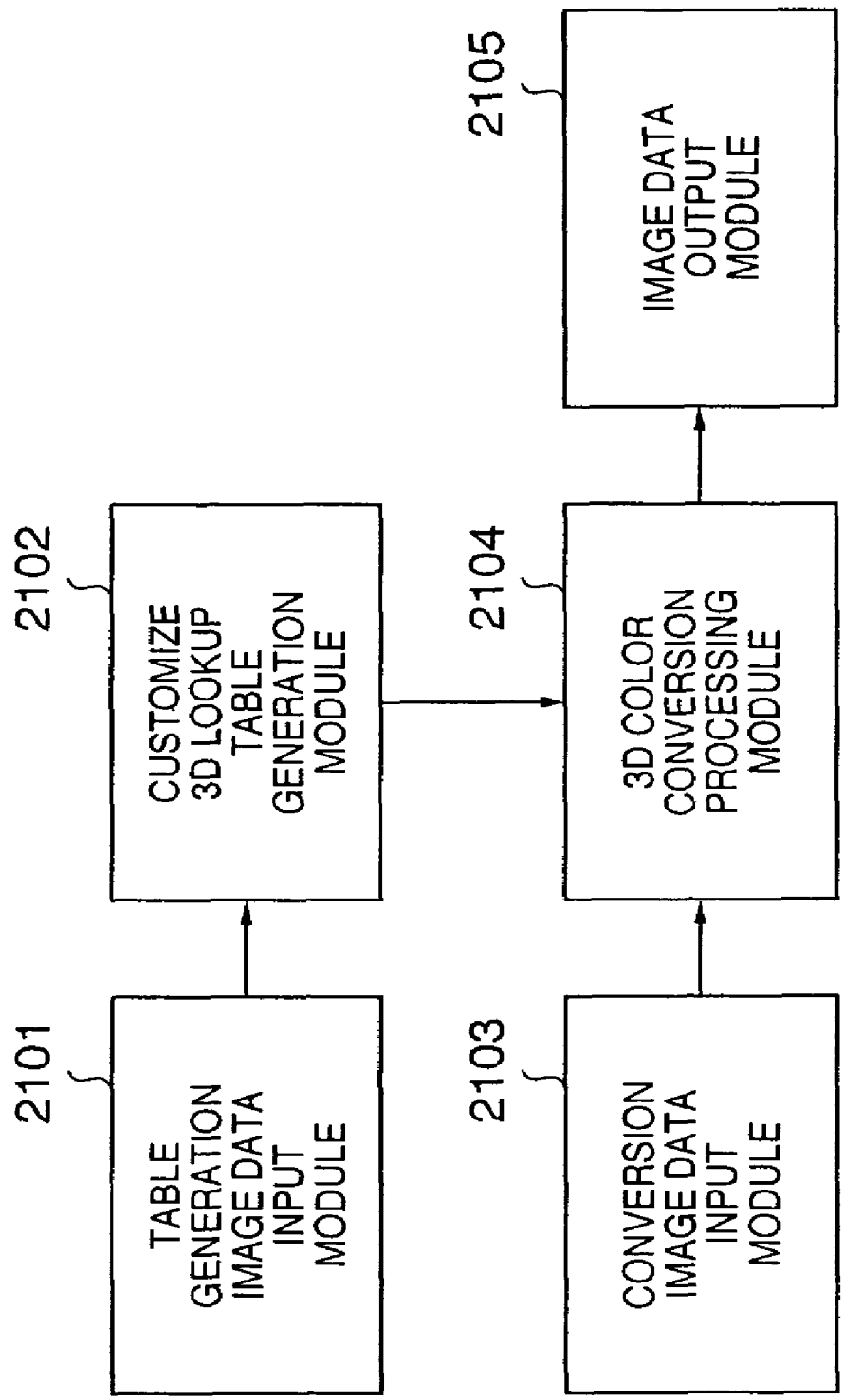
FIG. 16 is a block diagram showing the functional arrangement of the lookup table generation process and color conversion process according to the fourth embodiment.

FIG. 16 is a block diagram showing the functional arrangement of the lookup table generation process and color conversion process according to the fourth embodiment. Respective functional modules are implemented when the CPU 2011 executes the lookup table generation processing program 2015d and color conversion processing program 2015e loaded onto the RAM 2013. The lookup table generation process and color conversion process according to the fourth embodiment will be described below using the block diagram of FIG. 16. In this embodiment, N=3 of an N-dimensional lookup table, and the generation process of a lookup table in a three-dimensional (3D) color space (assumed to be an RGB space) and the color conversion process will be explained, for the sake of simplicity.

Referring to FIG. 16, a table generation image data input module 2101 receives image data (source image 2015a, destination image 2015b) based on which the 3D lookup table is generated. For example, the user inputs the source image 2015a as conversion source image data from the digital camera 2021 or scanner 2022. The user retouches local or entire colors of the source image 2015a according to his or her preference to generate the destination image 2015b, and stores that image.

The source image 2015a and destination image 2015b are sent to a customize 3D lookup table generation module 2102 (to be referred to as a lookup table generation module 2102 hereinafter), which generates a 3D lookup table on the basis of the source and destination images. Note that the lookup table generation module 2102 is implemented when the CPU 2011 executes the lookup table generation processing program 2015d.

After the customized 3D lookup table is generated, image data to be converted using this customized 3D lookup table is input to a conversion image data input module 2103. This module reads out signal values on the basis of the format of the image data, and sends them to a 3D color conversion processing module 2104. The 3D color conversion processing module 2104 executes a color conversion process using the 3D lookup table generated by the lookup table generation module 2102. The signal values of the image that has undergone the color conversion process undergoes format conversion in an image data output module 2105 on the basis of the image data format designated by the user, and the converted image is output. The flow of the lookup table generation process and color conversion process in this embodiment has been briefly explained. These processes will be described in more detail below.

Figure 17:
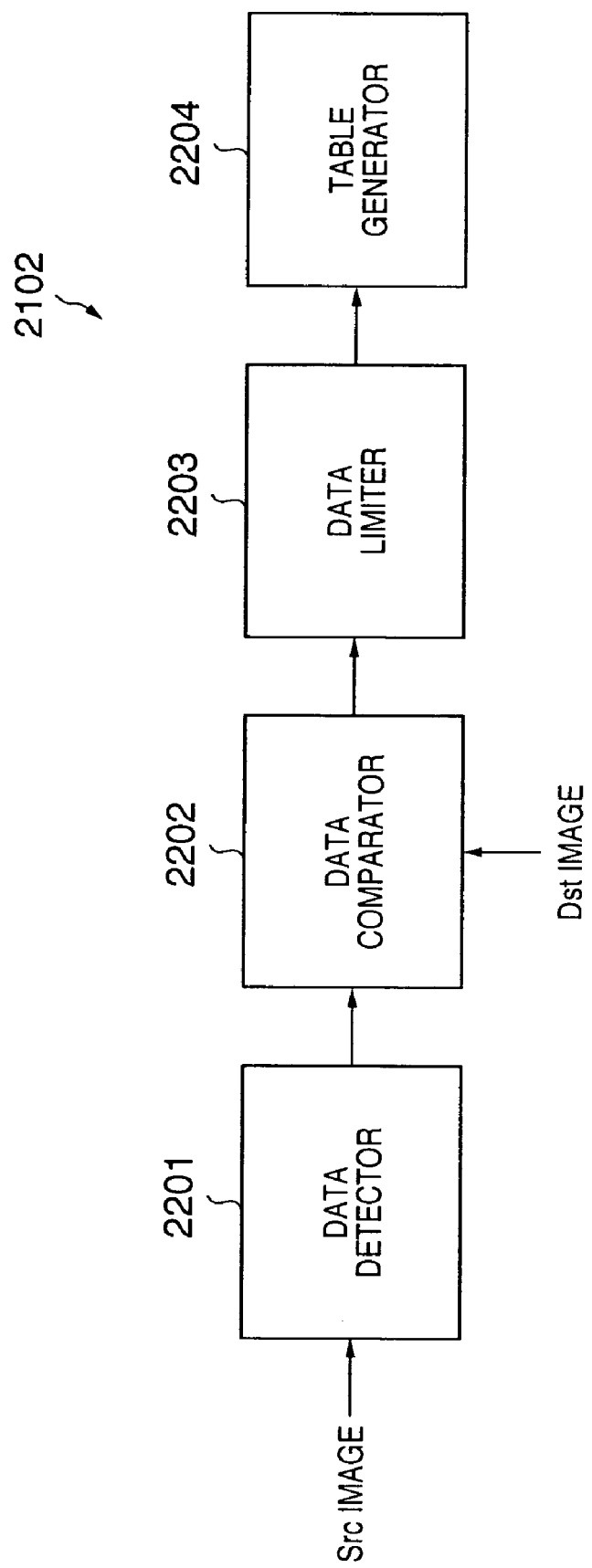
FIG. 17 is a block diagram showing a detailed functional arrangement of a lookup table generation module 2102.

FIG. 17 is a block diagram showing a detailed functional arrangement of the lookup table generation module 2102.

In this embodiment, a 3D lookup table having 729 (=9×9×9) grid points is prepared by setting the grid point interval (step interval)=32 as in the first to third embodiments. Furthermore, the I-th, J-th, and K-th grid point values of the 3D lookup table in the R, G, and B directions are given by:

$$Rg = 32 \times I \quad (40)$$

$$Gg = 32 \times J \quad (41)$$

$$Bg = 32 \times K \quad (42)$$

Grid point storage values corresponding to these grid point values are expressed by:

$$Rt = 3DTblR(I, J, K) \quad (43)$$

$$Gt = 3DTblG(I, J, K) \quad (44)$$

$$Bt = 3DTblB(I, J, K) \quad (45)$$

(for I=0 to 8, J=0 to 8, and K=0 to 8)

For example, if I=1, J=2, and K=3, grid point storage values corresponding to grid point values (32×1, 32×2, 32×3) =(32, 64, 96) are (3DTblR(1, 2, 3), 3DTblG(1, 2, 3), 3DTblB (1, 2, 3)). This means that data conversion using this 3D lookup table converts input signal values (32, 64, 96) into (3DTblR(1, 2, 3), 3DTblG(1, 2, 3), 3DTblB(1, 2, 3)). By setting the 3D lookup table to have Rt=Rg, Gt=Gg, and Bt=Bg at all grid points, a 3D lookup table which has equal inputs and outputs is generated.

A data detector 2201 detects pixels having signal values near grid point values (Rg, Gg, Bg). Let (Rs(x, y), Gs(x, y), Bs(x, y)) (where x and y are the coordinate values of an image) be the signal values of the source image (Src image). Then, a difference E between the grid point values and signal values is calculated by:

$$E = \sqrt{(Rg - Rs(x,y))^2 + (Gg - Gs(x,y))^2 + (Bg - Bs(x,y))^2} \quad (46)$$

If this difference (distance on the color space) E of the signal values is equal to or smaller than a predetermined value L, values near that grid point are determined. After values near the grid point, i.e., a pixel that satisfies E≦L is retrieved from the source image, a data comparator 2202 reads out signal values (Rd(x, y), Gd(x, y), Bd(x, y)) of the destination image (Dst image) corresponding to the coordinate position (x, y) of that pixel, and calculates differences (those for respective dimensions) dR, dG, and dB between the RGB values of the source and destination images for respective components, and a signal value difference (distance on the color space) Diff by:

$$dR = Rs(x, y) - Rd(x, y) \tag{47}$$

$$dG = Gs(x, y) - Gd(x, y) \tag{48}$$

$$dB = Bs(x, y) - Bd(x, y) \tag{49}$$

$$\text{Diff} = \sqrt{\begin{array}{c}(Rs(x, y) - Rd(x, y))^2 + (Gs(x, y) - Gd(x, y))^2 + \\ (Bs(x, y) - Bd(x, y))^2\end{array}} \tag{50}$$

The differences dR, dG, and dB between the RGB signal values of the source and destination images for respective components, and the signal value difference Diff are sent to a data limiter 2203. The data limiter 2203 compares a predetermined threshold value T with the signal value difference Diff. If the signal value difference Diff is larger than the threshold value T, the data limiter 2203 calculates values dR', dG', and dB' obtained by correcting dR, dG, and dB by:

$$Gain = T/\text{Diff} \tag{51}$$

$$dR' = dR \times Gain \tag{52}$$

$$dG' = dG \times Gain \tag{53}$$

$$dB' = dB \times Gain \tag{54}$$

If the signal value difference Diff is equal to or smaller than the threshold value T, dR'=dR, dG'=dG, and dB'=dB.

With the above process, average values dRave, dGave, and dBave of dR', dG', and dB' of the entire source image for given grid point values (Rg, Gg, Bg) are calculated. If no pixel having values near the grid point is found from the source image, dRave=dGave=dBave=0.

The values dRave, dGave, and dBave calculated by the above method are sent to a table generator 2204 to calculate grid point storage values (Rt, Gt, Bt) corresponding to the grid point values (Rg, Gg, Bg) of the customized 3D lookup table by:

$$Rt = Rg - dRave \tag{55}$$

$$Gt = Gg - dGave \tag{56}$$

$$Bt = Bg - dBave \tag{57}$$

By repeating the aforementioned processes for all the grid points of the 3D lookup table, a customized 3D lookup table is generated.

Figure 18:
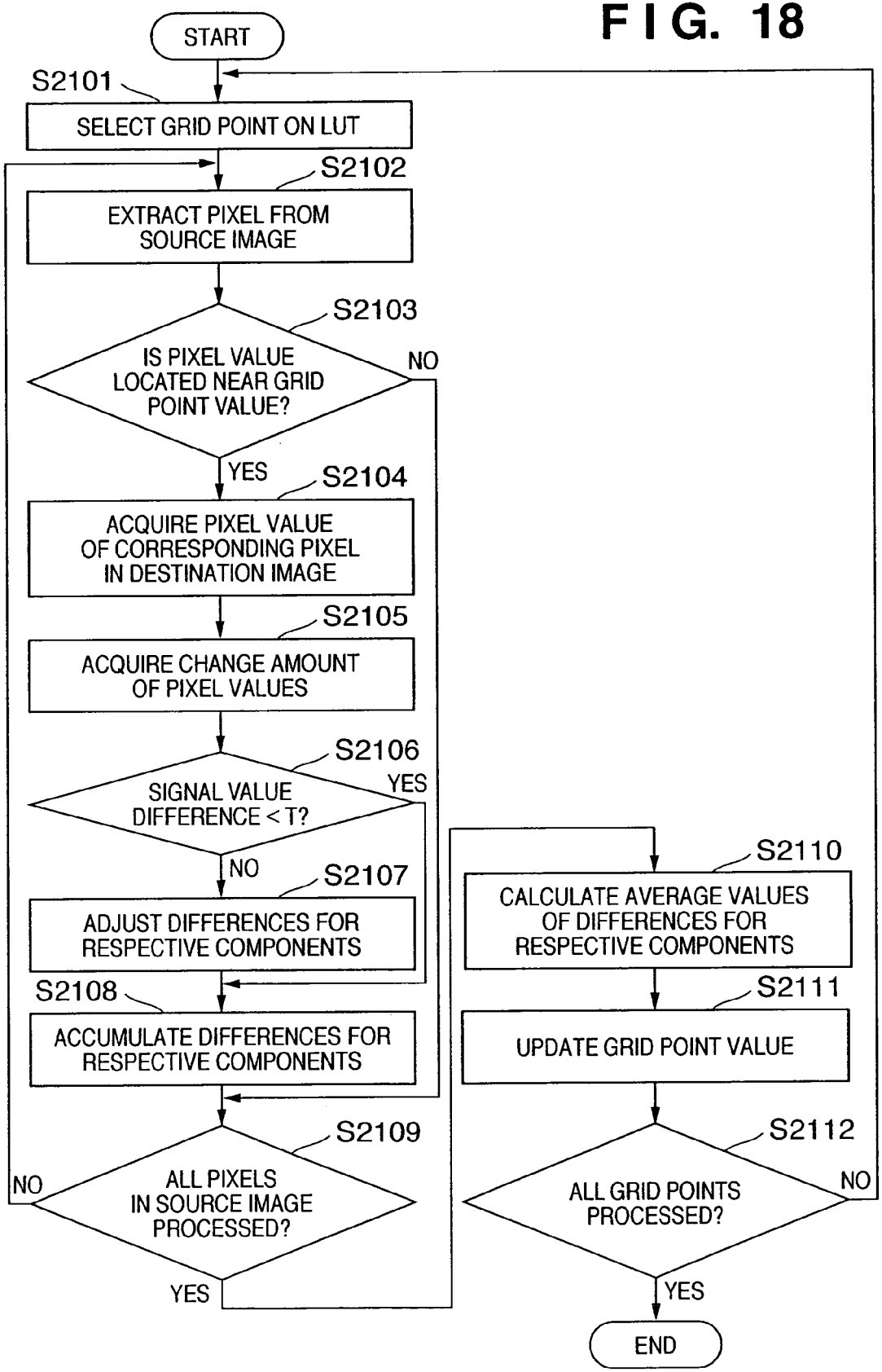
FIG. 18 is a flow chart for explaining the lookup table generation process according to the fourth embodiment.

FIG. 18 is a flow chart for explaining the lookup table generation process according to the fourth embodiment. The aforementioned lookup table generation process will be described in more detail below with reference to the flow chart of FIG. 18.

In step S2101, one grid point on the lookup table is selected. Steps S2102 and S2103 correspond to processes in the data detector 2201. In step S2102, one pixel is selected from the source image. It is checked in step S2103 if the pixel values of the pixel selected in step S2102 are located near the grid point values. This checking step is attained by seeing if E given by equation (46) above is equal to or smaller than the predetermined value L. If the pixel values of the selected pixel are not located near the grid point values of the grid point selected in step S2101 (E>L), the flow jumps to step S2109. It is determined in step S2109 whether or not the process is completed for all pixels in the source image. If pixels to be processed remain, the flow returns to step S2102 to select the next pixel from the source image.

If it is determined in step S2103 that the pixel values of the selected pixel are located near the grid point values, the flow advances to step S2104. Steps S2104 and S2105 correspond to processes in the data comparator 2202. In step S2104, the pixel values of a pixel in the destination image corresponding to the pixel selected in step S2102 are acquired. In step S2105, the pixel values in the source image are compared with those in the destination image to acquire differences (dB, dG, dR) for respective components and a signal value difference (Diff) (equations (47) to (50)).

Steps S2106 to S2110 correspond to the processing contents of the data limiter 2203. In step S2106, the signal value difference Diff is compared with the predetermined value T. If the signal value difference Diff is larger than the predetermined value T, the flow advances to step S2107 to adjust the differences dB, dG, and dR for respective components on the basis of the signal value difference Diff and threshold value T using equations (51) to (54).

In step S2108, the differences (dB, dG, dR) for respective color components, which are obtained in step S2105 and are adjusted in step S2107 as needed, are accumulated. If the processes in steps S2102 to S2108 are complete for all the pixels in the source image (step S2109), the flow advances to step S2110 to calculate the average values (dBave, dGave, dRave) of the respective change amounts accumulated in step S2108.

Steps S2111 and S2112 correspond to the processing contents of the table generator 2204. In step S2111, the grid point values are updated using the average values calculated in step S2110 to determine grid point storage values of the lookup table (equations (55) to (57)). By repeating the aforementioned process for all the grid points of the lookup table (step S2112), the customized lookup table is generated.

Figure 19:
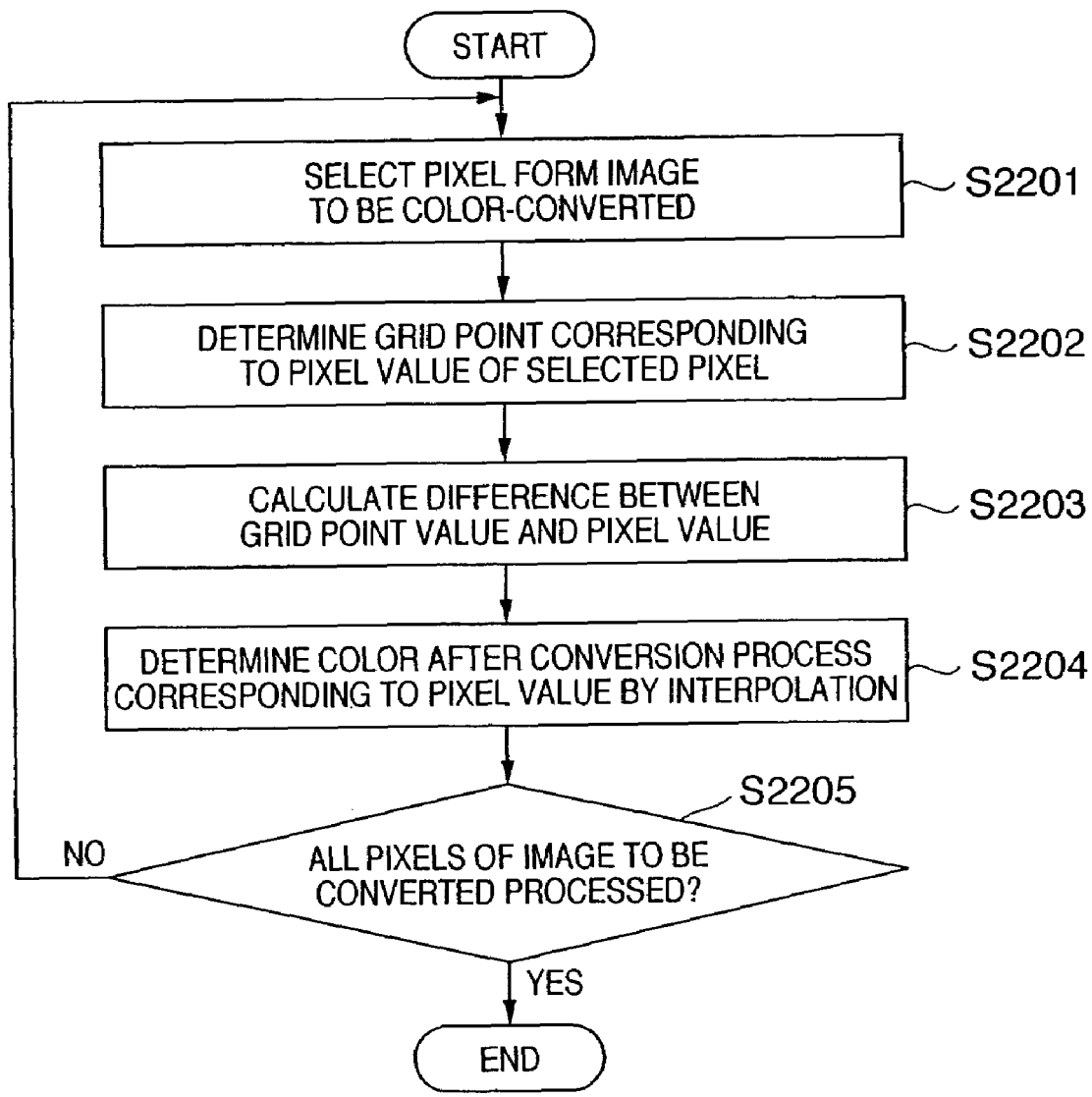
FIG. 19 is a flow chart for explaining a 3D color conversion process according to the fourth embodiment.

The 3D color conversion processing module 2104 using the lookup table generated in this way will be described below. FIG. 19 is a flow chart for explaining the 3D color conversion process according to this embodiment.

Values I, J, and K indicating indices of a grid point are calculated from RGB signal values R, G, and B of an image sent form the conversion image input module 2103 (step S2201, S2202).

$$I = R/32 \tag{58}$$

$$J = G/32 \tag{59}$$

$$K = B/32 \tag{60}$$

(where fractions below the decimal point of I, J, and K are dropped)

Furthermore, values (Rf, Gf, Bf) indicating distances of the RGB signal values R, G, and B of the image from the grid point values are calculated (step S2203) by:

$$Rf = R - I \times 32 \tag{61}$$

$$Gf = G - J \times 32 \tag{62}$$

$$Bf = B - K \times 32 \tag{63}$$

Based on the aforementioned values, values Ro, Go, and Bo obtained by converting the RGB signal values R, G, and B of the image using the 3D lookup table and cubic interpolation are respectively calculated (step S2204) by:

$Ro=$ $$(3\text{DTbl}R(I,J,K) \times (32-Rf) \times (32-Gf) \times (32-Bf) + 3\text{DTbl}R \\ (I+1,J,K) \times (Rf) \times (32-Gf) \times (32-Bf) + 3\text{DTbl}R(I,J+1, \\ K) \times (32-Rf) \times (Gf) \times (32-Bf) + 3\text{DTbl}R(I,J,K+1) \times \\ (32-Rf) \times (32-Gf) \times (Bf) + 3\text{DTbl}R(I+1,J+1,K) \times \\ (Rf) \times (Gf) \times (32-Bf) + 3\text{DTbl}R(I+1,J,K+1) \times (Rf) \times \\ (32-Gf) \times (Bf) + 3\text{DTbl}R(I,J+1,K+1) \times (32-Rf) \times \\ (Gf) \times (Bf) + 3\text{DTbl}R(I+1,J+1,K+1) \times (Rf) \times (Gf) \times \\ (Bf))/(32 \times 32 \times 32) \quad (64)$$

$Go=$ $$(3\text{DTbl}G(I,J,K) \times (32-Rf) \times (32-Gf) \times (32-Bf) + 3\text{DTbl}G \\ (I+1,J,K) \times (Rf) \times (32-Gf) \times (32-Bf) + 3\text{DTbl}G(I,J+1, \\ K) \times (32-Rf) \times (Gf) \times (32-Bf) + 3\text{DTbl}G(I,J,K+1) \times \\ (32-Rf) \times (32-Gf) \times (Bf) + 3\text{DTbl}G(I+1,J+1,K) \times \\ (Rf) \times (Gf) \times (32-Bf) + 3\text{DTbl}G(I+1,J,K+1) \times (Rf) \times \\ (32-Gf) \times (Bf) + 3\text{DTbl}G(I,J+1,K+1) \times (32-Rf) \times \\ (Gf) \times (Bf) + 3\text{DTbl}G(I+1,J+1,K+1) \times (Rf) \times (Gf) \times \\ (Bf))/(32 \times 32 \times 32) \quad (65)$$

$Bo=$ $$(3\text{DTbl}B(I,J,K) \times (32-Rf) \times (32-Gf) \times (32-Bf) + 3\text{DTbl}B \\ (I+1,J,K) \times (Rf) \times (32-Gf) \times (32-Bf) + 3\text{DTbl}B(I,J+1, \\ K) \times (32-Rf) \times (Gf) \times (32-Bf) + 3\text{DTbl}B(I,J,K+1) \times \\ (32-Rf) \times (32-Gf) \times (Bf) + 3\text{DTbl}B(I+1,J+1,K) \times \\ (Rf) \times (Gf) \times (32-Bf) + 3\text{DTbl}B(I+1,J,K+1) \times (Rf) \times \\ (32-Gf) \times (Bf) + 3\text{DTbl}B(I,J+1,K+1) \times (32-Rf) \times \\ (Gf) \times (Bf) + 3\text{DTbl}B(I+1,J+1,K+1) \times (Rf) \times (Gf) \times \\ (Bf))/(32 \times 32 \times 32) \quad (66)$$

The aforementioned conversion is repeated for all the pixels of the target image (step S2205). With the above process, the R, G, and B signals of the image input tot he conversion image data input module 2103 are converted into Ro, Go, and Bo for respective pixels using the 3D lookup table and interpolation, and are sent to the image data output module 2105.

The image data output module 2105, for example, displays an image on the display 2014 using the converted RGB values. Alternatively, the image data output module 2105 converts the converted RGB values into YMCK values to output an image using the printer 2023.

As described above, according to this embodiment, upon generating the lookup table using the source and destination images, a large change amount of a grid point is limited. Hence, the lookup table free from any tone jump can be generated.

Note that the fourth embodiment uses equation (50) to calculate the signal difference value Diff between the source and destination images. Alternatively, whether or not the change amount must be adjusted may be determined by seeing if any of the values dR, dG, and dB given by equations (47), (48), and (49) is larger than the threshold value T. In this case, the signal value difference Diff is calculated by:

$$\text{Diff}=\text{Max}(|dR|, |dG|, |dB|) \quad (67)$$

where |A| is a function of calculating the absolute value, and Max(A1, A2, A3) is a function of obtaining a maximum value of A1, A2, and A3.

Upon calculating the signal difference value Diff between the source and destination images, the RGB signal values may be converted into signal values on a color space such as a uniform color space (CIE L*a*b*) that considers human visual characteristics, or various other color spaces such as Yuv, HSB, NTSC-RGB, sRGB, and the like.

The method of calculating the value Gain in the data limiter 2203 is not limited to equation (51). For example, a table arithmetic operation using the signal value difference Diff and threshold value T as arguments may be used. The interpolation arithmetic operation in the 3D color conversion processing module 2104 is cubic interpolation. However, the interpolation arithmetic operation is not particularly limited as long as data can be interpolated. For example, tetrahedral interpolation may be used. In this embodiment, signals are converted on the RGB space. However, the present invention is not limited to such specific embodiment. For example, the present invention may be implemented using a four-dimensional lookup table for a color space having four values (e.g., C, M, Y, and G), and an N-dimensional lookup table for a color space having N values.

Fifth Embodiment

The fifth embodiment will be described below. In the fourth embodiment, whether or not the change amount is to be adjusted (limited) is determined by seeing if the signal value difference for each pixel between the source and destination images is larger than a predetermined value. In the fifth embodiment, whether or not the change amount is to be adjusted is determined by seeing if the sum total of change amounts is larger than a predetermined value.

The apparatus arrangement (FIG. 15) and the basic flow of the lookup table generation process and color conversion process (FIG. 16) according to the fifth embodiment are the same as those in the fourth embodiment. Differences from the fourth embodiment will be explained below.

Figure 20:
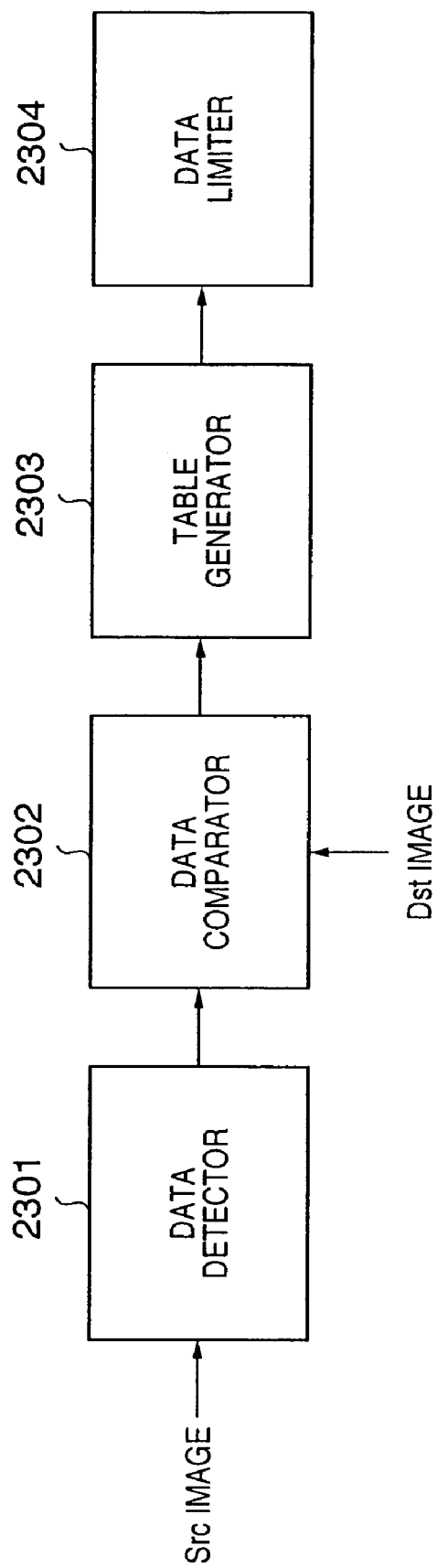
FIG. 20 is a block diagram showing a detailed functional arrangement of a lookup table generation module 2102 according to the fifth embodiment.
Figure 21:
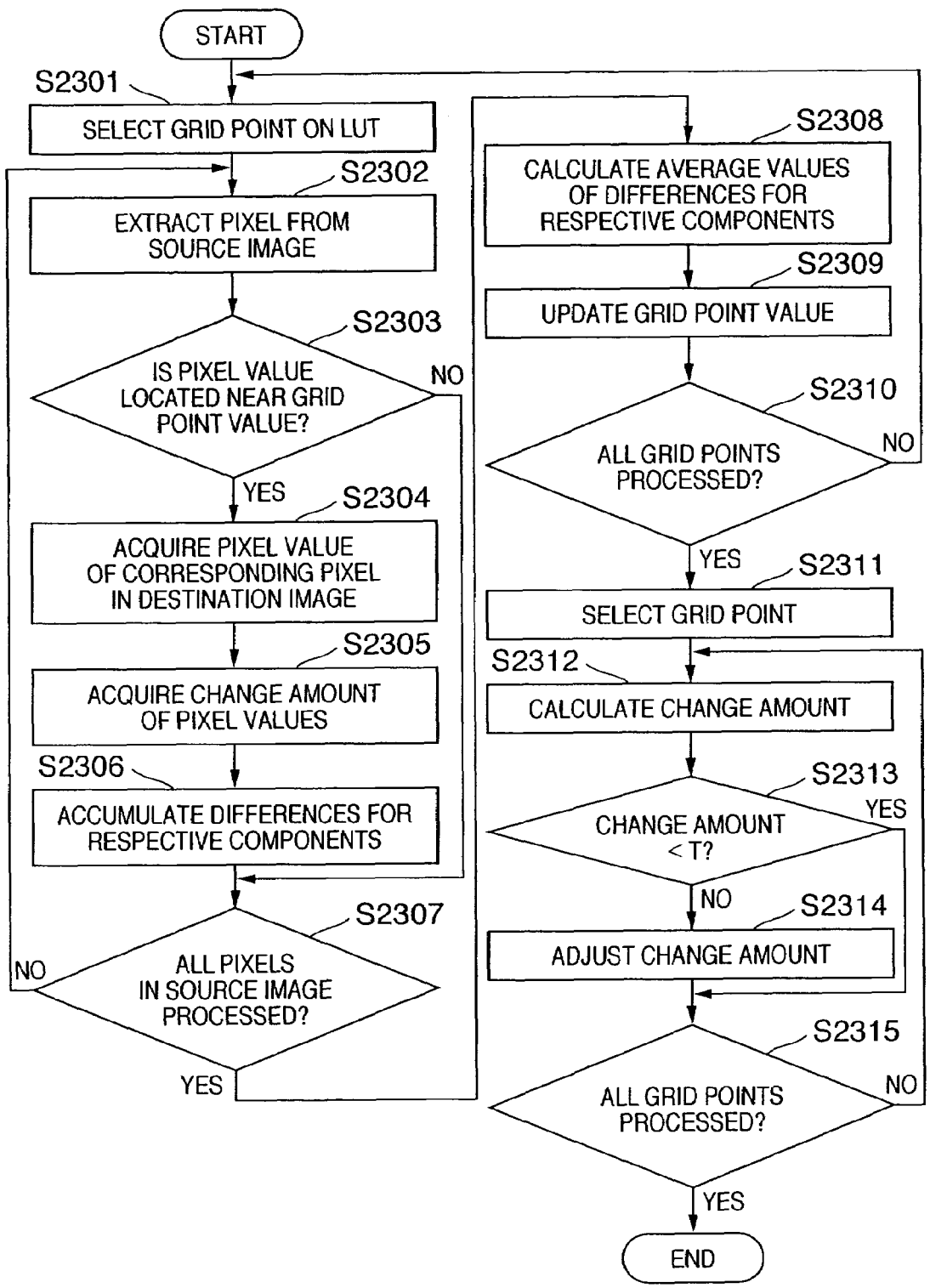
FIG. 21 is a flow chart for explaining the lookup table generation process according to the fifth embodiment.

FIG. 20 is a block diagram showing a detailed functional arrangement of the lookup table generation module 2102 according to the fifth embodiment. FIG. 21 is a flow chart for explaining the sequence of the lookup table generation process according to the fifth embodiment. A data detector 2301 detects pixels having signal values near grid point values (Rg, Gg, Bg). Let (Rs(x, y), Gs(x, y), Bs(x, y)) (where x and y are the coordinate values of an image) be the signal values of the source image. Then, a difference E between the grid point values and signal values is calculated by:

$$E=\sqrt{(Rg-Rs(x,y))^2+(Gg-Gs(x,y))^2+(Bg-Bs(x,y))^2} \quad (68)$$

If this difference E of the signal values is equal to or smaller than a predetermined value L, values near that grid point are determined. After values near the grid point, i.e., a pixel that satisfies E≦L is retrieved from the source image, a data comparator 2302 reads out signal values (Rd(x, y), Gd(x, y), Bd(x, y)) of the destination image corresponding to the coordinate position (x, y) of that pixel, and calculates differences dR, dG, and dB between the RGB values of the source and destination images for respective components by:

$$dR=Rs(x, y)-Rd(x, y) \quad (69)$$

$$dG=Gs(x, y)-Gd(x, y) \quad (70)$$

$$dB=Bs(x, y)-Bd(x, y) \quad (71)$$

With the above process, average values dRave, dGave, and dBave of dR, dG, and dB of the entire source image for given grid point values (Rg, Gg, Bg) are calculated. If no pixel having values near the grid point is found from the source image, dRave=dGave=dBave=0.

The values dRave, dGave, and dBave calculated by the above method are sent to a table generator 2303 to calculate grid point storage values (Rt, Gt, Bt) corresponding to the grid point values (Rg, Gg, Bg) of the customized 3D lookup table by:

$$Rt=Rg-dR\text{ave} \quad (72)$$

$$Gt=Gg-dG\text{ave} \quad (73)$$

$$Bt=Bg-dB\text{ave} \quad (74)$$

By repeating the aforementioned processes for all the grid points, a customized 3D lookup table is generated.

The generated 3D lookup table data are sent to a table limiter 2304. The table limiter 2304 calculates a difference Diff between the grid point values (Rg, Gg, Bg) of the 3D lookup table and corresponding grid point storage values (Rt, Gt, Bt) using:

$$\text{Diff}=\sqrt{(Rg-Rt)^2+(Gg-Gt)^2+(Bg-Bt)^2} \quad (75)$$

If the calculated difference Diff is smaller than a predetermined threshold value T, the values Rt, Gt, and Bt are used without any adjustment. However, if the value Diff is equal to or larger than the threshold value T, grid point storage values Rt', Gt', and Bt' are calculated by:

$$\text{Gain}=T/\text{Diff} \quad (76)$$

$$Rt'=Rg+(Rt-Rg)\times\text{Gain} \quad (77)$$

$$Gt'=Gg+(Gt-Gg)\times\text{Gain} \quad (78)$$

$$Bt'=Bg+(Bt-Bg)\times\text{Gain} \quad (79)$$

By repeating the aforementioned process for all the grid points of the lookup table, the lookup table values can be limited.

FIG. 21 is a flow chart for explaining the lookup table generation process according to the fifth embodiment. The lookup table generation process of the fifth embodiment will be described in more detail below with reference to the flow chart of FIG. 21.

In step S2301, one grid point on the lookup table is selected. Steps S2302 and S2303 correspond to processes in the data detector 2301. In step S2302, one pixel is selected from the source image. It is checked in step S2303 if the pixel values of the pixel selected in step S2302 are located near the grid point values. This checking step is attained by seeing if E given by equation (68) above is equal to or smaller than the predetermined value L. If the pixel values of the selected pixel are not located near the grid point values of the grid point selected in step S2301 (E>L), the flow jumps to step S2307. It is determined in step S2307 whether or not the process is completed for all pixels in the source image. If pixels to be processed remain, the flow returns to step S2302 to select the next pixel from the source image.

If it is determined in step S2303 that the pixel values of the selected pixel are located near the grid point values, the flow advances to step S2304. Steps S2304 to S2308 correspond to processes in the data comparator 2302.

In step S2304, the pixel values of a pixel in the destination image corresponding to the pixel selected in step S2302 are acquired. In step S2305, the pixel values in the source image are compared with those in the destination image to acquire differences (dB, dG, dR) for respective components (equations (69) to (71)).

In step S2306, the change amounts acquired in step S2305 are respectively accumulated. If the above processes are complete for all the pixels in the source image, the flow advances to step S2308 to calculate the average values (dBave, dGave, dRave) of the change amounts accumulated in step S2306. Steps S2309 and S2310 correspond to the processing contents of the table generator 2303. In step S2309, the grid point values are updated using the average values calculated in step S2308 to determine grid point storage values of the customized lookup table (equations (72), (73), and (74)).

After the aforementioned process is repeated for all the grid points of the lookup table (step S2310), the flow advances to step S2311.

Steps S2311 to S2315 correspond to processes in the table limiter 2304. In step S2311, a grid point is selected. In step S2312, a difference Diff between the grid point values and the grid point storage values updated in step S2309 of the selected grid point is calculated. The difference Diff is compared with a threshold value T in step S2313. If the difference Diff is larger than the predetermined value T, the flow advances to step S2314 to adjust the grid point storage values on the basis of the difference Diff and threshold value T using equations (76) to (79). The processes in steps S2311 to S2314 are repeated for all the grid points (step S2315), thus obtaining a final lookup table.

Note that the operation of the 3D color conversion processing module 2104 is substantially the same as that in the fourth embodiment, except that the lookup table generated by the aforementioned method is used, and a detailed description thereof will be omitted.

Note that the fifth embodiment uses equation (75) to calculate the difference Diff using the grid point values (Rg, Gg, Bg) and corresponding grid point storage values (Rt, Gt, Bt). However, the present invention is not limited to such specific equation. For example, the maximum value of change amounts for respective dimensions may be used as the signal value difference Diff. In this case, $$\text{Diff}=\text{Max}(|Rt-Rg|, |Gt-Gg|, |Bt-Bg|) \quad (80)$$

where |A| is a function of calculating the absolute value, and Max(A1, A2, A3) is a function of obtaining the maximum value of A1, A2, and A3 is used in place of equation (75).

Upon calculating the signal difference value Diff between the grid point values and grid point storage values, the RGB signal values may be converted into signal values on a color space such as a uniform color space (CIE L*a*b*) that considers human visual characteristics, or various other color spaces such as Yuv, HSB, NTSC-RGB, sRGB, and the like.

The method of calculating the value Gain in the data limiter 2304 is not limited to equation (76). For example, a table arithmetic operation using the signal value difference Diff and threshold value T as arguments may be used. The fifth embodiment adopts the method of calculating the signal value difference Diff using the grid point values (Rg, Gg, and Bg) and their grid point storage values (Rt, Gt, Bt), and limiting the table values using this signal value difference. Alternatively, a reference 3D lookup table may be prepared in advance, and whether or not customized table values are limited may be determined using the grid point storage values (Rtk, Gtk, Btk) of that reference table. In this case, in steps S2312 to S2314 grid point storage values (Rt', Gt', Bt') of 3D lookup table data are calculated using:

$$\text{Diff}=\sqrt{(Rtk-Rt)^2+(Gtk-Gt)^2+(Btk-Bt)^2} \quad (81)$$

$$\text{Gain}=T/\text{Diff} \quad (82)$$

$$Rt'=Rtk+(Rt-Rtk)\times\text{Gain} \quad (83)$$

$$Gt'=Gtk+(Gt-Gtk)\times\text{Gain} \quad (84)$$

$$Bt'=Btk+(Bt-Btk)\times\text{Gain} \quad (85)$$

In the above embodiments, as a process for limiting change amounts, the threshold value T and distance (or maximum value of differences for respective component values) Diff are used, and T/Diff is applied to respective component values or table values. However, the present invention is not limited to this. For example, a value y=f(T/Diff) obtained by a function f(x) based on T/Diff may be multiplied.

Sixth Embodiment

The sixth embodiment will be described below. In the above embodiments, conversion from N dimensions to N dimensions has been described. In the sixth embodiment, conversion from N dimensions to M dimensions (N≠M) will be explained. A case will be exemplified below wherein a color expressed on a 4-dimensional (4D) color space is converted into a color expressed on a 3D color space.

Figure 22:
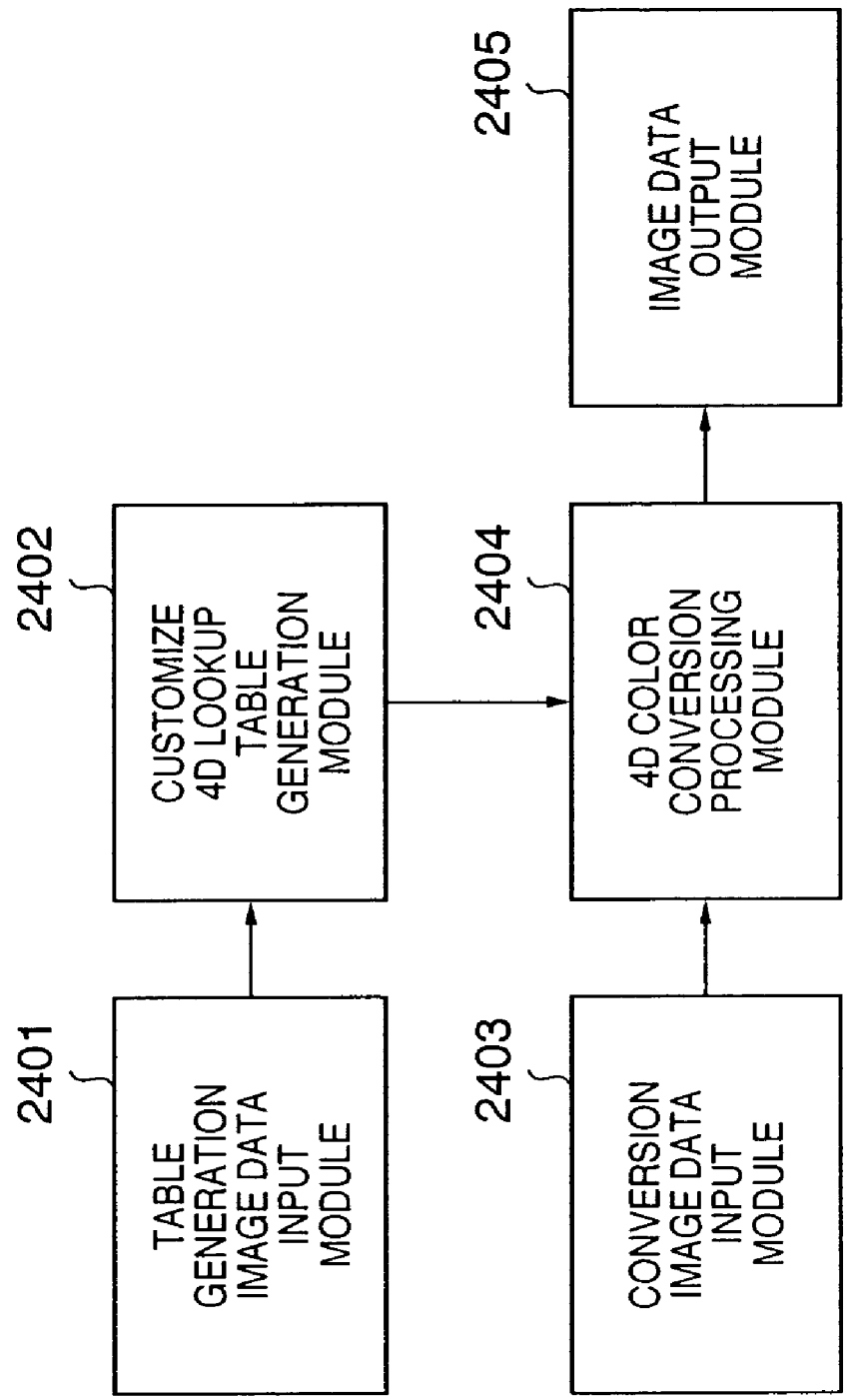
FIG. 22 is a block diagram showing the functional arrangement of the lookup table generation process and color conversion process according to the fifth embodiment.

FIG. 22 is a block diagram showing the functional arrangement of a lookup table generation process and color conversion process according to the sixth embodiment.

Referring to FIG. 22, a table generation image data input module 2401 receives image data (source image 2015a, destination image 2015b) based on which a 4D lookup table is generated. For example, the user inputs the source image 2015a as conversion source image data from the digital camera 2021 or scanner 2022. The user retouches local or entire colors of the source image 2015a according to his or her preference to generate the destination image 2015b, and stores that image.

The source image 2015a and destination image 2015b are sent to a customize 4D lookup table generation module 2402, which generates a 4D lookup table on the basis of the source and destination images. After the customized 4D lookup table is generated, image data to be converted using this customized 4D lookup table is input to a conversion image data input module 2403. The conversion image data input module 2403 reads out signal values on the basis of the format of the image data, and sends them to a 4D color conversion processing module 2404. The 4D color conversion processing module 2404 executes a color conversion process using the 4D lookup table generated by the 4D lookup table generation module 2402. The signal values of the image that has undergone the color conversion process undergo format conversion in an image data output module 2405 on the basis of the image data format designated by the user, and the converted image is output. The flow of the processes has been briefly explained.

The customize 4D lookup table generation module 2402 and 4D color conversion processing module 2404 will be described in more detail below.

Figure 23:
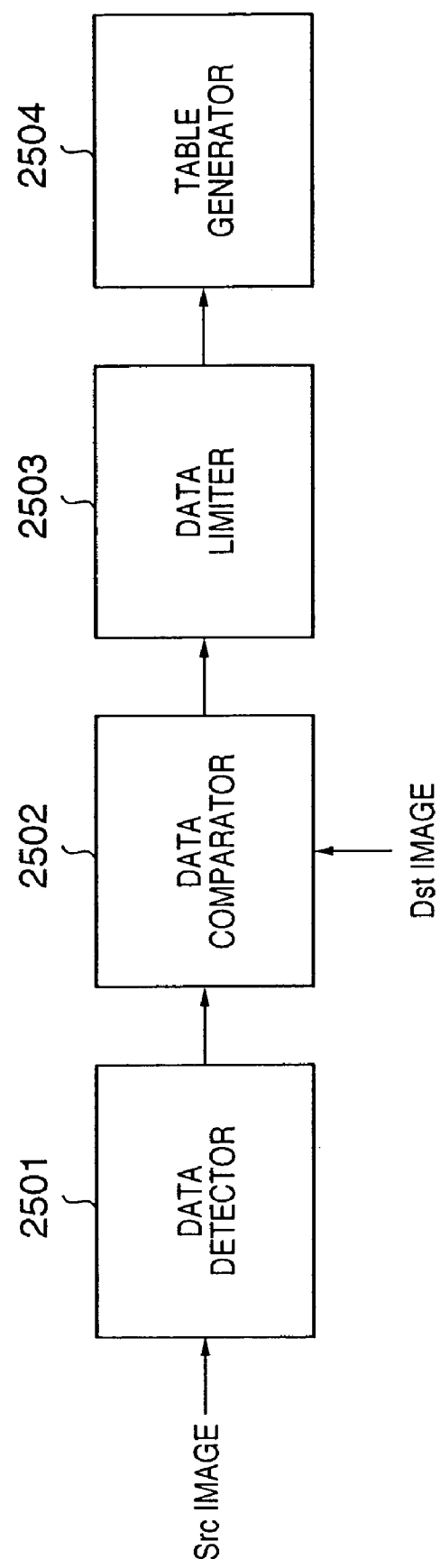
FIG. 23 is a block diagram showing a detailed functional arrangement of a customize four-dimensional (4D) lookup table generation module 2402.

FIG. 23 is a block diagram showing a detailed functional arrangement of the customize 4D lookup table generation module 2402. A 4D lookup table of the sixth embodiment has 9×9×9×9 grid points at grid point intervals (step intervals) =32, and converts an input signal as a set of four signals C, M, Y, and G into an output signal as a set of three signals Y, U, and V.

A data detector 2501 detects pixels having signal values near grid point values (Cg, Mg, Yg, Gg). Let (Cs(x, y), Ms(x, y), Ys(x, y), Gs(x, y)) (where x and y are the coordinate values of an image) be the signal values of the source image. Then, a difference E between the grid point values and signal values is calculated by:

$$E = \sqrt{(Cg - Cs(x, y))^2 + (Mg - Ms(x, y))^2 + (Yg - Ys(x, y))^2 + (Gg - Gs(x, y))^2} \quad (86)$$

If this difference E of the signal values is equal to or smaller than a predetermined value L, values near that grid point are determined. After values near the grid point, i.e., a pixel that satisfies E≦L is retrieved from the source image, a data comparator 2502 reads out signal values (Cd(x, y), Md(x, y), Yd(x, y), Gd(x, y)) of the destination image corresponding to the coordinate position (x, y) of that pixel, and calculates differences dC, dM, dY, and dG between the CMYG values of the source and destination images for respective components, and a signal value difference Diff by:

$$dC = Cs(x, y) - Cd(x, y) \quad (87)$$

$$dM = Ms(x, y) - Md(x, y) \quad (88)$$

$$dY = Ys(x, y) - Yd(x, y) \quad (89)$$

$$dG = Gs(x, y) - Gd(x, y) \quad (90)$$

$$\text{Diff} = \sqrt{(Cs(x, y) - Cd(x, y))^2 + (Ms(x, y) - Md(x, y))^2 + (Ys(x, y) - Yd(x, y))^2 + (Gs(x, y) - Gd(x, y))^2} \quad (91)$$

The calculated differences dC, dM, dY, and dG for respective components and signal value difference Diff between the CMYG signal values of the source and destination images are sent to a data limiter 2503. The data limiter 2503 compares a predetermined threshold value T with the signal value difference Diff. If the signal value difference Diff is larger than the threshold value T, the data limiter 2503 calculates dC', dM', dY', and dG' obtained by correcting dC, dM, dY, and dG using:

$$\text{Gain} = T/\text{Diff} \quad (92)$$

$$dC' = dC \times \text{Gain} \quad (93)$$

$$dM' = dM \times \text{Gain} \quad (94)$$

$$dY' = dY \times \text{Gain} \quad (95)$$

$$dG' = dG \times \text{Gain} \quad (96)$$

On the other hand, if the signal value difference Diff is equal to or smaller than the threshold value T, dC'=dC, dM'=dM, dY'=dY, and dG'=dG.

With the above process, average values dCave, dMave, dYave, and dGave of dC', dM', dY', and dG' on the entire source image for given grid point values (Cg, Mg, Yg, Gg) are calculated. If no pixel having values near the grid point is found from the source image, dCave=dMave=dYave=dGave=0. The average values dCave, dMave, dYave, and dGave calculated by the above method are sent to a table generator 2504 to calculate grid point storage values (Yt, Ut, Vt) corresponding to the grid point values (Cg, Mg, Yg, Gg) of the customized 4D lookup table by:

$$Ct = Cg - dC\text{ave} \quad (97)$$

$$Mt = Mg - dM\text{ave} \quad (98)$$

$$Yt = Yg - dY\text{ave} \quad (99)$$

$$Gt = Gg - dG\text{ave} \quad (100)$$

$$Rt = \text{Conv}R(Cg, Mg, Yg, Gg) \quad (101)$$

$$Gt = \text{Conv}G(Cg, Mg, Yg, Gg) \quad (102)$$

$$Bt = \text{Conv}B(Cg, Mg, Yg, Gg) \quad (103)$$

where ConvR is a conversion formula that calculates an R signal from the CMYG signals, ConvG is a conversion formula that calculates a G signal from the CMYG signals, and ConvB is a conversion formula that calculates a B signal from the CMYG signals.

$$Yt=0.3\times Rt+0.59\times Gt+0.11\times Bt \quad (104)$$

$$Ut=(Bt-Yt)\times 0.564 \quad (105)$$

$$Vt=(Rt-Yt)\times 0.713 \quad (106)$$

By repeating the aforementioned processes for all the grid points, a 4D lookup table is generated.

The 4D color conversion processing module 2404 converts C, M, Y, and G signals into Yo, Uo, and Vo signals for respective pixels of an image input to the conversion image data input module 2403 using the interpolation operation described in the fourth embodiment. The obtained Yo, Uo, and Vo signals are sent to the image data output module 2405.

In the above embodiment, the generation process of the 4D lookup table used to convert CMYG signals into YUV signals, and the color conversion process have been explained. However, the present invention is not limited to this, and a generation process of an N-dimensional lookup table used to convert N-dimensional signals into M-dimensional signals, and a color conversion process can be implemented.

As described above, according to the fourth to sixth embodiments, since an N-dimensional lookup table is generated while limiting its table values, a phenomenon such as tone jump or the like caused by discontinuity of N-dimensional lookup table data can be prevented.

Another Embodiment

The scope of the present invention includes a case wherein the functions of the embodiments are implemented by supplying a program code of software that implements the functions of the embodiments to a computer (or a CPU or MPU) in a system or apparatus, which is connected to various devices to make these devices implement the functions of the aforementioned embodiments, and making the computer of the system or apparatus control the devices in accordance with the stored program.

In this case, the program code itself of software implements the functions of the embodiments, and the program code itself, and means for supplying the program code to the computer (i.e., a recording medium which stores the program code) constitutes the present invention. As the recording medium for storing such program code, for example, a flexible disk, hard disk, optical disk, magnetooptical disk, CD-ROM, magnetic tape, nonvolatile memory card, ROM, and the like may be used.

The program code is included in the embodiments of the present invention not only when the functions of the above embodiments are implemented by executing the supplied program code by the computer, but also when the functions of the embodiments are implemented by collaboration of the program and an OS (operating system) or another application software running on the computer.

Furthermore, the present invention includes a case wherein the functions of the above embodiments are implemented by some or all of actual processing operations executed by a CPU or the like arranged in a function extension board or a function extension unit, which is inserted in or connected to the computer, after the supplied program code is written in a memory of the extension board or unit.

As described above, according to the present invention, an image with a color appearance of user's preference can be easily obtained.

According to the present invention, color conversion parameters can be automatically set on the basis of images before and after an edit process by retouching or the like an edit process by retouching or the like, and color conversion of user's preference can be easily implemented.

Furthermore, according to the present invention, color conversion parameters can be automatically set on the basis of a pair of colors designated by the user, and color conversion of user's preference can be easily obtained.

Moreover, according to the present invention, only a desired color and those close to the desired color can be changed.

As described above, according to the present invention, discontinuity of color conversion due to a color conversion table can be prevented.

As many apparently widely different embodiments of the present invention can be made without departing from the spirit and scope thereof, it is to be understood that the invention is not limited to the specific embodiments thereof except as defined in the claims.

What is claimed is:

1. An image processing apparatus comprising:
   input device which inputs an image sensed by image sensing device;
   acquisition device which acquires at least one pixel value pair based on a source pixel value obtained from an image and a destination pixel value obtained from an image;
   determination device which determines an image processing parameter for converting one pixel value of the pixel value pair into the other pixel value of said pixel value pair, on the basis of the acquired pixel value pair;
   registration device which registers the image processing parameter determined by said determination device; and
   conversion device which converts pixel values of an input image input by said input device on the basis of the image processing parameter registered by said registration device, and outputs a converted image as an output image.

2. The apparatus according to claim 1, wherein said acquisition device acquires the pixel value pair on the basis of a pair of pixel values of corresponding pixels in a first image and a second image obtained by retouching the first image.

3. The apparatus according to claim 1, wherein said acquisition device acquires the pixel value pair based on a pair of pixel values from one image recorded on a detachable recording medium.

4. The apparatus according to claim 1, wherein said acquisition device acquires the pixel value pair based on a pair of pixel values of corresponding pixels in a first image recorded on a detachable recording medium, and a second image which is recorded on the detachable recording medium and is different from the first image.

5. The apparatus according to claim 1, further comprising designation device which allows a user to designate a pair of regions on an image, and wherein said acquisition device acquires at least one pixel value pair corresponding to the pair of regions designated by said designation device.

6. The apparatus according to claim 2, wherein for each of a plurality of grid points set on a color space,
   said acquisition device extracts pixels having pixel values near a grid point of interest from the first image, and extracts pixels in the second image corresponding to the extracted pixels, said acquisition device determines a pixel value after change of the grid point of interest on the basis of the pixel values of the pixels extracted from the first and second images, and said acquisition device sets a pixel value of the grid point of interest, and the determined pixel value after change as the pixel value pair.

7. The apparatus according to claim 2, wherein the first and second images have the same image size, and are stored in a storage medium in the same image format.

8. The apparatus according to claim 2, wherein
the first and second images are thumbnail images obtained by reducing images input by said input device.

9. The apparatus according to claim 1, wherein said acquisition device includes an acquiring unit which acquires a designated value pair consisting of first and second pixel values on the basis of first and second designated positions designated on one or two images, and a determination unit which determines the pixel value pair on the basis of the designated value pair.

10. The apparatus according to claim 9, wherein for each of a plurality of grid points set on a color space,
said acquisition device extracts designated value pairs, the first color signal values of which are located near a grid point of interest, from designated value pairs acquired by said acquiring unit, said acquisition device determines a color signal value after change of the grid point of interest on the basis of changes of the first and second pixel values in the extracted designated value pairs, and said acquisition device sets the pixel value of the grid point of interest, and the determined pixel value after change as the pixel value pair.

11. The apparatus according to claim 9, wherein the two images have the same image size, and are stored in a storage medium in the same image format.

12. The apparatus according to claim 9, wherein
the two images are thumbnail images having a smaller size than the input image to be converted by said conversion device.

13. The apparatus according to claim 1, further comprising:
selection device which selects one of a plurality of processing modes using different image processing parameters, and wherein said registration device registers the image processing parameter determined by said determination device as one of the plurality of processing modes, and when said selection device selects one of the processing modes, said conversion device executes a conversion process using the image processing parameter registered by said registration device.

14. The apparatus according to claim 1, further comprising holding device which stores the image processing parameter determined by said determination device in a first storage medium, and wherein said conversion device stores the output image in a second storage medium.

15. The apparatus according to claim 1, further comprising:
display device which displays the image, and
wherein said registration device registers a plurality of different image processing parameters in correspondence with a processing mode, and
the plurality of different image processing parameters are displayed on said display device.

16. The apparatus according to claim 1, wherein the conversion process includes:
inputting an input image input by said input device,
processing the input image by interpolation so that all pixels of respective color components have values;
amplifying a color difference of the input image that has undergone the interpolation process;
applying gamma conversion to the input image whose color difference has been amplified; and
applying hue correction to the input image that has undergone the gamma conversion, and
said determination device changes parameters in the interpolation process, color difference amplification, and hue correction.

17. The apparatus according to claim 1, wherein said determination device applies inverse conversion of said conversion device to the pixel value before conversion of the pixel value pair using an image processing parameter which is set in advance, and
said determination device changes the image processing parameter to reduce a difference between a pixel value obtained by processing the pixel value obtained by the inverse conversion by said conversion device, and the pixel value after conversion of the pixel value pair.

18. The apparatus according to claim 1, wherein the conversion process has:
multi-dimensional lookup table conversion device which converts an image using a multi-dimensional lookup table to obtain an output image, and
said determination device changes the multi-dimensional lookup table on the basis of the pixel value pair.

19. The apparatus according to claim 18, wherein the multi-dimensional lookup table is a three-dimensional lookup table including R, G, and B as elements.

20. The apparatus according to claim 1, wherein said image processing apparatus is a camera which has a plurality of image sensing modes.

21. The apparatus according to claim 20 wherein said registration device registers the image processing parameter as an image sensing mode, and said conversion device converts the pixel values of the input image on the basis of the image processing parameter in case the image sensing mode is set.

22. The apparatus according to claim 21, further comprising a setting device configured to set an image sensing mode from a plurality of image sensing modes in accordance with a user's designation.

23. An apparatus for generating a color conversion table, comprising:
storage device which stores first and second images, pixel values of which are expressed on an N-dimensional color space;
generation device which generates an N-dimensional color conversion table on the basis of differences between pixel values of corresponding pixels in the first and second images; and
adjustment device which adjusts generation of table values of the color conversion table by said generation device so that a change amount of a pixel value defined by the color conversion table generated by said generation device does not exceed a predetermined value;
wherein when a difference between grid point data of the color conversion table generated by said generation device and a reference table is not less than a predetermined value, said adjustment device adjusts the grid point data of the color conversion table; and
wherein let $(A0, A1, A2, \ldots, AN)$ be grid point data of the color conversion table, $(B0, B1, B2, \ldots, BN)$ be grid point data of the reference table, and Diff be the difference, and when the difference Diff given by:

$$\text{Diff} = \sqrt{(A0-B0)^2 + (A1-B1)^2 + (A2-B2)^2 + \ldots + (An-Bn)^2}$$

is larger than a predetermined threshold value T, said adjustment device multiplies the grid point data by a value obtained based on the threshold value T and the difference Diff.

24. The apparatus according to claim 23 wherein when a maximum value Diff of differences between corresponding grid point data of the color conversion table and reference table for respective components is larger than the threshold value T, said adjustment device multiplies respective components of the grid point data of the color conversion table by a value obtained based on the threshold value T and Diff.

25. An apparatus for generating a color conversion table, comprising:
    storage device which stores first and second images, pixel values of which are expressed on an N-dimensional color space;
    generation device which generates an N-dimensional color conversion table on the basis of differences between pixel values of corresponding pixels in the first and second images; and
    adjustment device which adjusts generation of table values of the color conversion table by said generation device so that a change amount of a pixel value defined by the color conversion table generated by said generation device does not exceed a predetermined value;
    wherein when a distance between the pixel values of the corresponding pixels on the color space exceeds a threshold value, said adjustment device adjusts the difference between the pixel values of the corresponding pixels on the basis of the distance and the threshold value; and
    wherein let $(A0, A1, A2, \ldots, AN)$ be pixel values in the first image, $(B0, B1, B2, \ldots, BN)$ be pixel values of corresponding pixels in the second image, and Diff be the distance, and when the distance Diff given by:

$$\text{Diff} = \sqrt{(A0-B0)^2 + (A1-B1)^2 + (A2-B2)^2 + \ldots + (An-Bn)^2}$$

is larger than a predetermined threshold value T, said adjustment device multiplies differences between the corresponding pixels for respective components by a value obtained based on the threshold value T and the distance Diff.

26. An image processing method comprising:
    inputting an image sensed by image sensing device;
    acquiring at least one pixel value pair based on a source pixel value obtained from an image and a destination pixel value obtained from an image;
    determining an image processing parameter for converting one pixel value of the pixel value pair into the other pixel value of said pixel value pair, on the basis of the acquired pixel value pair;
    registering the determined image processing parameter; and
    converting pixel values of an input image input by said input device on the basis of the registered image processing parameter, and outputting a converted image as an output image.

27. A computer readable medium which stores a control program for causing a computer to execute the image processing method of claim 26.

28. An apparatus for generating a color conversion table, comprising:
    storage device which stores first and second images, pixel values of which are expressed on an N-dimensional color space;
    generation device which generates an N-dimensional color conversion table on the basis of differences between pixel values of corresponding pixels in the first and second images; and
    adjustment device which adjusts generation of table values of the color conversion table by said generation device so that a change amount of a pixel value defined by the color conversion table generated by said generation device does not exceed a predetermined value;
    wherein when a distance between pixel values before and after conversion by the color conversion table generated by said generation device exceeds a threshold value, said adjustment device adjusts a corresponding table value in the color conversion table; and
    wherein let $(A0, A1, A2, \ldots, AN)$ be pixel values before conversion by the color conversion table, $(B0, B1, B2, \ldots, BN)$ be pixel values after conversion, and Diff be the distance, and when the distance Diff given by:

$$\text{Diff} = \sqrt{(A0-B0)^2 + (A1-B1)^2 + (A2-B2)^2 + \ldots + (An-Bn)^2}$$

is larger than a predetermined threshold value T, said adjustment device updates the color conversion table by multiplying the corresponding table value by a value obtained based on the threshold value T and the distance Diff.

29. An apparatus for generating a color conversion table, comprising:
    storage device which stores first and second images, pixel values of which are expressed on an N-dimensional color space;
    generation device which generates an N-dimensional color conversion table on the basis of differences between pixel values of corresponding pixels in the first and second images; and
    adjustment device which adjusts generation of table values of the color conversion table by said generation device so that a change amount of a pixel value defined by the color conversion table generated by said generation device does not exceed a predetermined value.

30. The apparatus according to claim 29, wherein when a difference between grid point data of the color conversion table generated by said generation device and a reference table is not less than a predetermined value, said adjustment device adjusts the grid point data of the color conversion table.

31. The apparatus according to claim 29, wherein said generation device comprises:
    detection device which detects, from the first image, pixels having pixel values within a predetermined distance range from a grid point value of a grid point selected from respective grid points of the N-dimensional color conversion table;
    calculation device which calculates an average value of differences between pixel values of corresponding pixels in the first and second images in association with the pixels detected by said detection device; and
    determination device which determines a value of the selected grid point on the basis of the average value calculated by said calculation device.

32. The apparatus according to claim 29, wherein when a distance between the pixel values of the corresponding pixels on the color space exceeds a threshold value, said adjustment device adjusts the difference between the pixel values of the corresponding pixels on the basis of the distance and the threshold value.

33. The apparatus according to claim 32 wherein said adjustment device determines, as the distance, a maximum value Diff of differences between pixel values for respective components of corresponding pixels of the first and second images, and when the distance is larger than a predetermined threshold value T, said adjustment device multiplies the differences for respective components by a value obtained based on the threshold value T and the distance Diff.

34. The apparatus according to claim 29, further comprising:
conversion device which converts data of respective grid points of the color conversion table generated by said generation device into data on an M-dimensional space.

35. A color conversion apparatus comprising:
input device which inputs image data;
conversion device which converts the image data input by said input device using a color conversion table generated by a conversion table generation apparatus of claim 29; and output device which outputs image data converted by said conversion device.

36. The apparatus according to claim 35, wherein for each pixel value of the image data,
said conversion device extracts a grid point near the pixel value from the conversion table,
said conversion device calculates a distance between the pixel value and the extracted grid point, and
said conversion device obtains a pixel value after conversion of the pixel value on the basis of grid point values of the extracted grid point and grid points near the extracted grid point, and the calculated distance.

37. An image sensing apparatus comprising a color conversion apparatus of claim 35.

38. The apparatus according to claim 29 wherein when a distance between pixel values before and after conversion by the color conversion table generated by said generation device exceeds a threshold value, said adjustment device adjusts a corresponding table value in the color conversion table.

39. The apparatus according to claim 38 wherein said adjustment device determines, as the distance, a maximum value Diff of differences between pixel values before and after conversion by the color conversion table for respective components, and when the distance is larger than a predetermined threshold value T, said adjustment device updates the color conversion table by multiplying the corresponding table value by a value obtained based on the threshold value T and Diff.

40. A method for generating a color conversion table, comprising:
generating an N-dimensional color conversion table on the basis of differences between pixel values of corresponding pixels in first and second images, pixel values of which are expressed on an N-dimensional color space; and
adjusting generation of table values of the color conversion table in the generating step so that a change amount of a pixel value defined by the color conversion table generated in the generation step does not exceed a predetermined value.

41. A color conversion method comprising:
inputting image data;
converting the image data input in the input step using a color conversion table generated by a conversion table generation method of claim 40; and
outputting image data converted in the converting step.

42. An image sensing apparatus for implementing a color conversion table generation method of claim 40.

43. A computer readable medium which stores a control program for causing a computer to execute the table generation method of claim 40.

* * * * *